(12) United States Patent
Nukui

(10) Patent No.: US 10,717,291 B2
(45) Date of Patent: Jul. 21, 2020

(54) LIQUID CARTRIDGE HAVING DETECTION MEMBER MOVABLE IN ACCORDANCE WITH DEFORMATION OF DEFORMABLE MEMBER

(71) Applicant: BROTHER KOGYO KABUSHIKI KAISHA, Nagoya-shi, Aichi-ken (JP)

(72) Inventor: Kosuke Nukui, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/522,775

(22) Filed: Jul. 26, 2019

(65) Prior Publication Data

US 2019/0344579 A1    Nov. 14, 2019

Related U.S. Application Data

(63) Continuation of application No. 16/032,202, filed on Jul. 11, 2018, now Pat. No. 10,399,352, which is a (Continued)

(30) Foreign Application Priority Data

Mar. 31, 2016  (JP) .................. 2016-072381

(51) Int. Cl.
*B41J 2/175*    (2006.01)

(52) U.S. Cl.
CPC ....... *B41J 2/17566* (2013.01); *B41J 2/17553* (2013.01); *B41J 2002/17573* (2013.01)

(58) Field of Classification Search
CPC ............... B41J 2/17503; B41J 2/17513; B41J 2/17556; B41J 2/17566; B41J 2/17573; B41J 2002/17573; B41J 2002/17586
See application file for complete search history.

(56) References Cited

U.S. PATENT DOCUMENTS 5,136,309 A    8/1992   Iida et al.
5,736,992 A    4/1998   Pawlowski, Jr.
(Continued)

FOREIGN PATENT DOCUMENTS

CN    101056767 A    10/2007
CN    101096144 A    1/2008
(Continued)

OTHER PUBLICATIONS

Application as filed in related U.S. Appl. No. 15/909,035, filed Mar. 1, 2018.
(Continued)

*Primary Examiner* — Scott A Richmond
(74) *Attorney, Agent, or Firm* — Merchant & Gould P.C.

(57) ABSTRACT

A liquid cartridge includes: a cartridge body defining a liquid chamber; a liquid-supply part; a deformable member protruding upward relative to the cartridge body; and a detection member having a detected part. The liquid chamber is configured such that an internal pressure thereof is reduced in accordance with outflow of liquid from the liquid chamber. The deformable member defines an inner space communicating with the liquid chamber, the deformable member being deformable such that a volume of the inner space is reduced in accordance with the reduction in the internal pressure of the liquid chamber. The detected part is movable from a first position to a second position, the detected part at the second position being in contact with the deformable member, the detected part being further movable from the second position to a third position below the second position in accordance with deformation of the deformable member.

6 Claims, 12 Drawing Sheets

Related U.S. Application Data continuation of application No. 15/277,030, filed on Sep. 27, 2016, now Pat. No. 10,022,975.

(56) References Cited

U.S. PATENT DOCUMENTS

| | | | |
|---|---|---|---|
| 7,424,824 | B2 | 9/2008 | Usui et al. |
| 8,317,306 | B2 | 11/2012 | Hattori |
| 2002/0122084 | A1 | 9/2002 | Shihoh et al. |
| 2004/0027430 | A1 | 2/2004 | Anderson et al. |
| 2007/0296775 | A1 | 12/2007 | Lee et al. |
| 2009/0122093 | A1 | 5/2009 | Mutoh |
| 2009/0289972 | A1 | 11/2009 | Iino |
| 2011/0241231 | A1 | 10/2011 | Mizutani et al. |
| 2011/0249064 | A1 | 10/2011 | Wang et al. |
| 2011/0292138 | A1* | 12/2011 | Ma .................. B41J 2/17566 347/86 |
| 2011/0310194 | A1 | 12/2011 | Takagi |
| 2013/0033552 | A1* | 2/2013 | Chen ................. B41J 2/17513 347/86 |
| 2013/0044164 | A1 | 2/2013 | Jia et al. |
| 2013/0141499 | A1 | 6/2013 | Tomoguchi et al. |
| 2014/0098145 | A1 | 4/2014 | Kanbe |
| 2014/0300671 | A1 | 10/2014 | Nie |
| 2016/0039215 | A1 | 2/2016 | Sugahara et al. |
| 2016/0279953 | A1 | 9/2016 | Hirano et al. |
| 2017/0282580 | A1 | 10/2017 | Takahashi |
| 2017/0282583 | A1 | 10/2017 | Okazaki |
| 2017/0282584 | A1 | 10/2017 | Nuki |
| 2017/0282585 | A1 | 10/2017 | Kobayashi |

FOREIGN PATENT DOCUMENTS

| | | |
|---|---|---|
| CN | 101098789 A | 1/2008 |
| CN | 101462410 A | 6/2009 |
| CN | 101491975 A | 7/2009 |
| CN | 201362034 Y | 12/2009 |
| CN | 101693424 A | 4/2010 |
| CN | 201645998 U | 11/2010 |
| CN | 102205729 A | 10/2011 |
| CN | 102218924 A | 10/2011 |
| CN | 202428813 U | 9/2012 |
| CN | 103182847 A | 7/2013 |
| CN | 103182848 A | 7/2013 |
| CN | 203110526 U | 8/2013 |
| EP | 2 371 555 A2 | 10/2011 |
| EP | 2524810 A1 | 11/2012 |
| EP | 2607088 A2 | 6/2013 |
| JP | 3156861 U | 1/2010 |
| JP | 3157392 U | 2/2010 |
| JP | 2013-527053 A | 6/2013 |
| WO | 2011050759 A1 | 5/2011 |

OTHER PUBLICATIONS

Application as filed in related U.S. Appl. No. 16/032,236, filed Jul. 11, 2018.
Application as filed in related U.S. Appl. No. 15/276,927, filed Sep. 27, 2016.
Application as filed in related U.S. Appl. No. 15/276,958, filed Sep. 27, 2016.
Application as filed in related U.S. Appl. No. 15/277,030, filed Sep. 27, 2016.
Application as filed in related U.S. Appl. No. 15/277,074, filed Sep. 27, 2016.
Extended European Search Report in related European Application No. 16190768.8, dated Nov. 27, 2017.
Extended European Search Report issued in related EP application No. 16190815.7, dated Aug. 22, 2017.
Extended European Search Report issued in related EP application No. 16190817.3, dated Sep. 13, 2017.
Extended European Search Report issued in related EP application No. 16190843.9, dated Jul. 27, 2017.
Office Action (Notice of Allowance) issued in related U.S. Appl. No. 15/909,035, dated Mar. 22, 2019.
Office Action (Notice of Allowance) issued in related U.S. Appl. No. 16/032,236, dated Feb. 25, 2019.
Office Action (Notice of Allowance) issued in related U.S. Appl. No. 15/276,927, dated Nov. 3, 2017.
Office Action issued in European Application No. 16190815.7, dated May 16, 2019.
Office Action issued in related U.S. Appl. No. 15/277,074, dated Oct. 6, 2017.
Office Action issued in related U.S. Appl. No. 15/909,035, dated Dec. 11, 2018.
Office Action issued in related U.S. Appl. No. 16/032,236, dated Nov. 2, 2018.
Office Action issued in related U.S. Appl. No. 15/277,030, dated Nov. 3, 2017.
U.S. Office Action (Notice of Allowance) issued in related U.S. Appl. No. 15/276,958, dated Mar. 26, 2018.
U.S. Office Action (Notice of Allowance) issued in related U.S. Appl. No. 15/277,030, dated Mar. 28, 2018.
U.S. Office Action (Notice of Allowance) issued in related U.S. Appl. No. 15/277,074, dated Jun. 4, 2018.
U.S. Office Action issue in related U.S. Appl. No. 15/276,958 dated Oct. 20, 2017.
Office Action issued in related European Patent Application No. 16190817.3, dated Jun. 25, 2019.
Office Action issued in related U.S. Appl. No. 16/136,454, dated Sep. 6, 2019.
Notification of First Office Action issued in related Chinese Patent Application No. 201610875127.7, dated Oct. 28, 2019.
Notification of First Office Action issued in related Chinese Patent Application No. 201610873342.3, dated Oct. 15, 2019.
Notification of First Office Action issued in related Chinese Patent Application No. 201610875492.8, dated Nov. 12, 2019.
Notification of First Office Action issued in related Chinese Patent Application No. 201610875792.6, dated Nov. 20, 2019.
Office Action (Notice of Reasons for Refusal) issued in related Japanese Patent Application No. 2016-072385, dated Jan. 8, 2020.

* cited by examiner

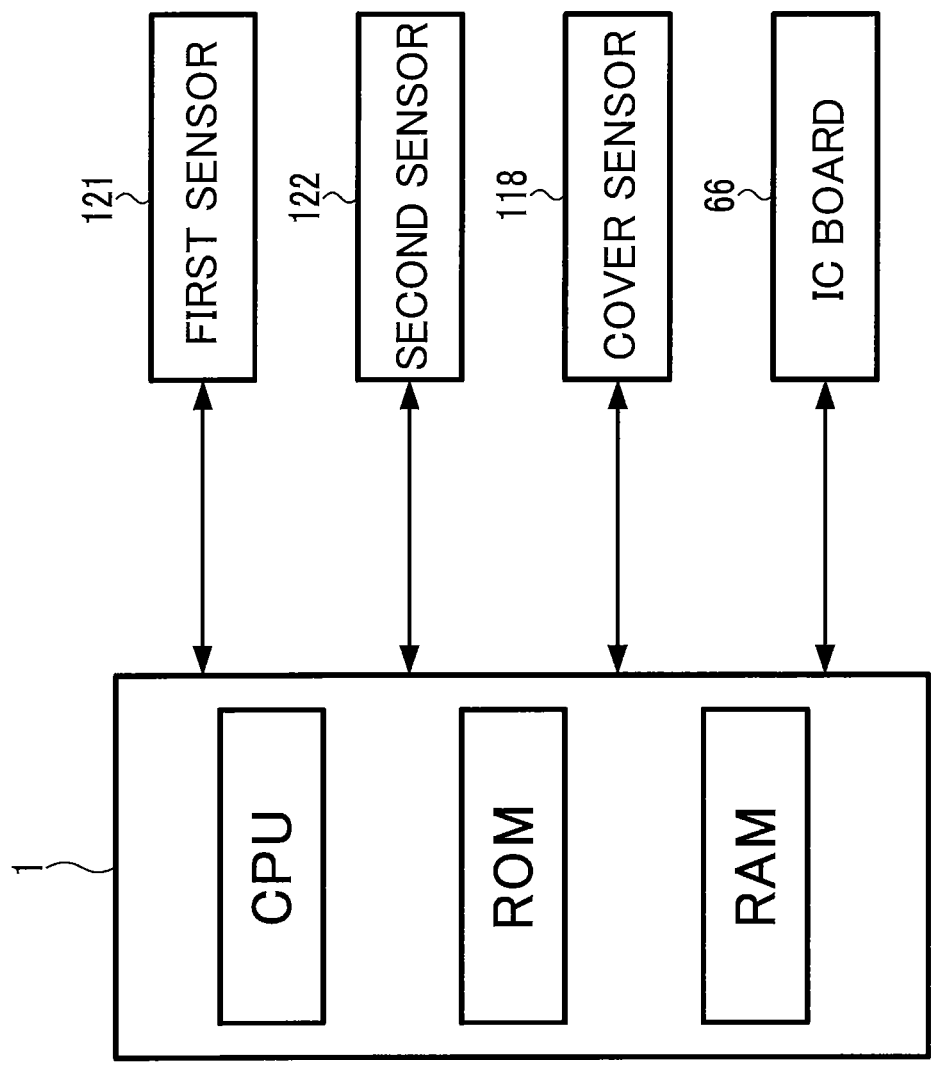

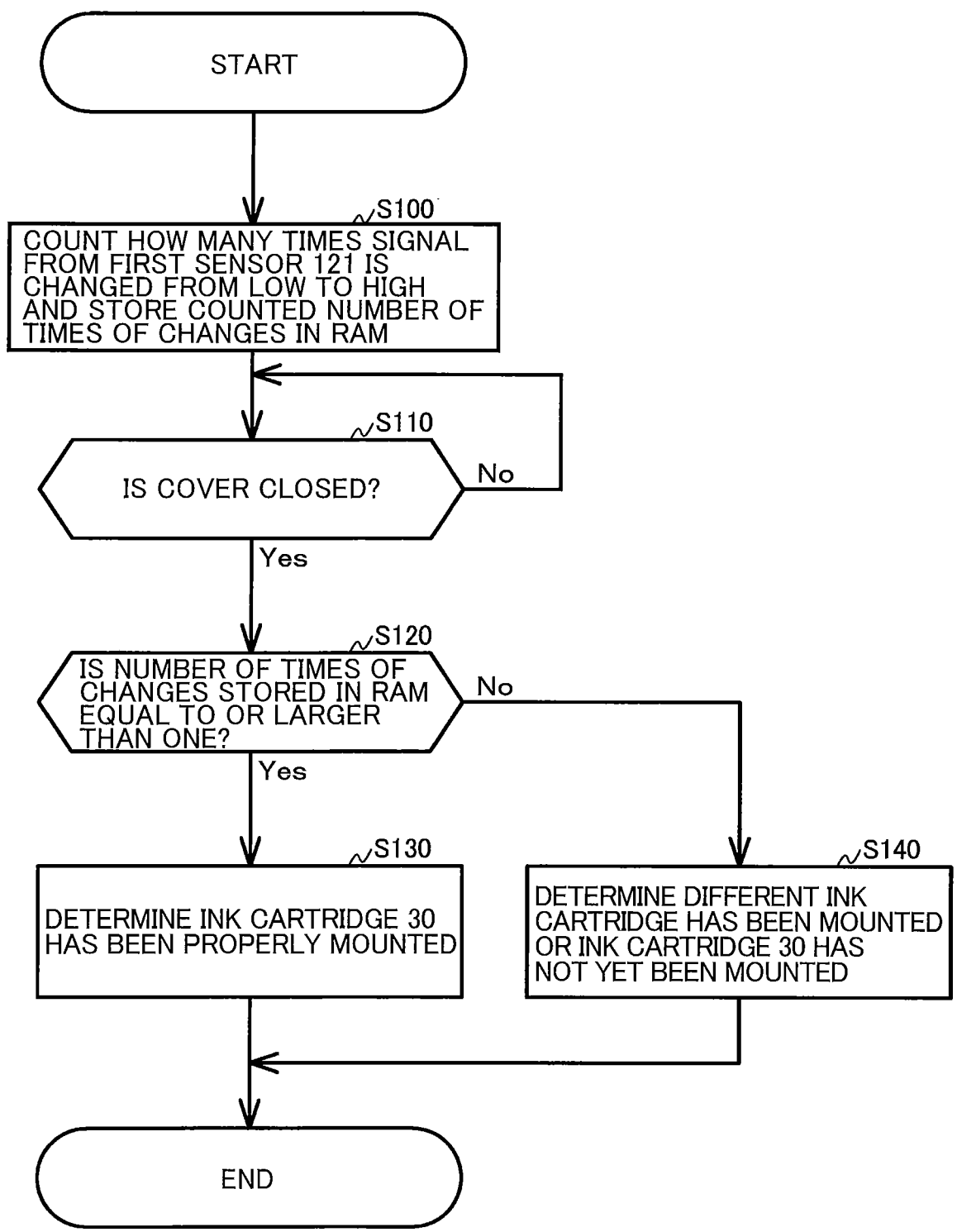

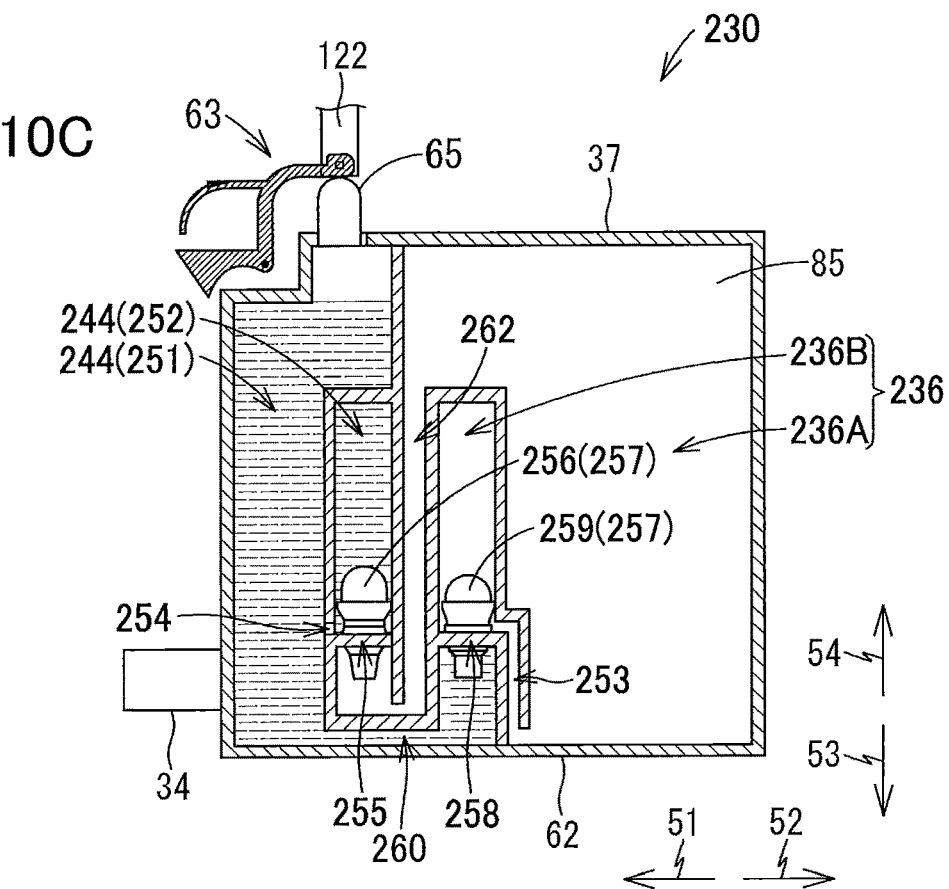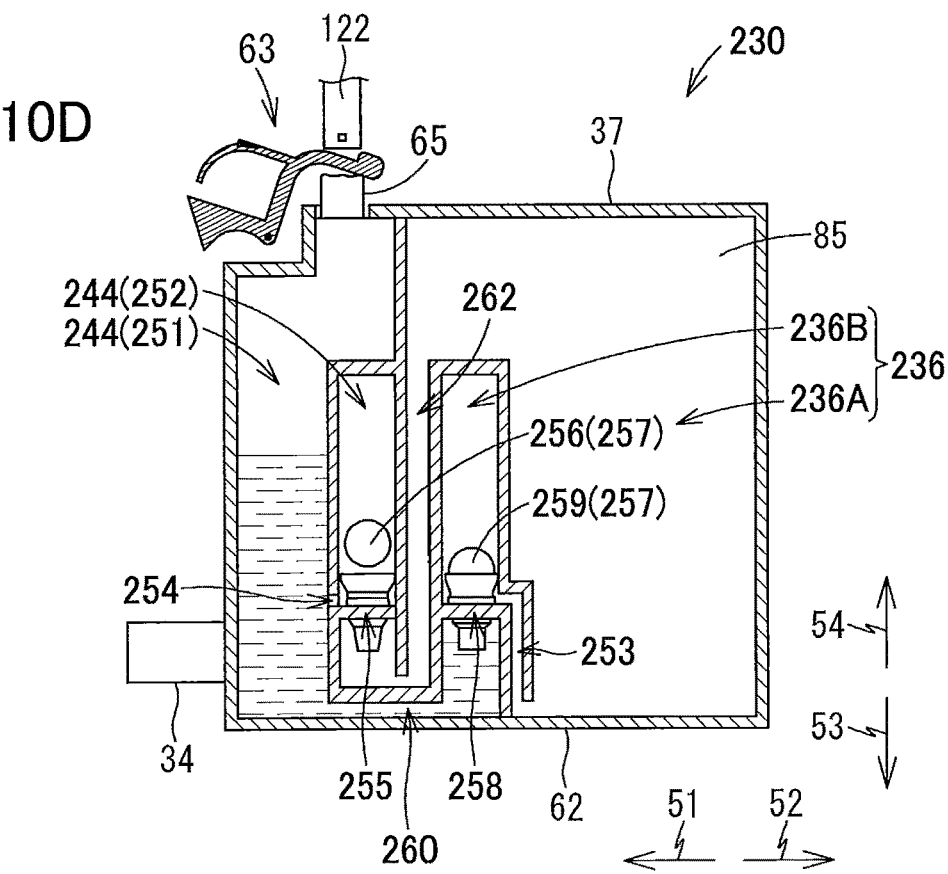

LIQUID CARTRIDGE HAVING DETECTION MEMBER MOVABLE IN ACCORDANCE WITH DEFORMATION OF DEFORMABLE MEMBER

CROSS REFERENCE TO RELATED APPLICATION

This application is a continuation of U.S. patent application Ser. No. 16/032,202, filed Jul. 11, 2018, which is a continuation of U.S. patent application Ser. No. 15/277,030, filed Sep. 27, 2016, and further claims priority from Japanese Patent Application No. 2016-072381 filed Mar. 31, 2016, and which applications are incorporated herein by reference. The entire contents of both applications are incorporated herein by reference.

TECHNICAL FIELD

The present disclosure relates to a liquid cartridge provided with a movable member that is movable in accordance with deformation of a deformable member.

BACKGROUND

There are conventional inkjet recording devices known in the art that can record an image onto a recording medium by ejecting ink stored in an ink container from nozzles. In one of such inkjet recording devices, a new ink cartridge can be attached for replacement every time ink is consumed.

Japanese Utility Model Registration No. 3156861 discloses an ink cartridge that is detachably mountable in a cartridge-receiving section of an ink jet recording device. The ink cartridge has a detecting mechanism for optically allowing detection of a residual amount of ink. The detecting mechanism includes a movable bar that is pivotally movable about a fixed shaft, and a soft support cap. When ink stored in an ink bag is consumed, the ink bag shrinks. When the ink bag shrinks, the soft support cap also shrinks, which causes the movable bar to change its pivoting posture. Optically detecting the change in the pivoting posture of the movable bar makes it possible to detect that ink has been consumed in the ink cartridge.

SUMMARY

In the above-described ink cartridge, since an inner space of the soft support cap is in communication with the ink bag, ink may flow into the inner space of the soft support cap. Hence, deformation of the soft support cap may possibly become unstable depending on whether or not ink exists in the inner space of the soft support cap. Accordingly, an amount of ink remaining in the ink bag, depending on which the movable bar changes its pivoting posture, also becomes unstable, rendering accurate detection of the residual amount of ink impossible.

Further, preferably, whether or not the ink cartridge has been attached to the cartridge-receiving section be detected at the inkjet recording device, since such detection can be utilized to prevent the inkjet recording device from performing image recording or maintenance while the ink cartridge is not attached.

For example, when a sufficient amount of ink remains in the ink cartridge, a sensor provided in the inkjet recording device can detect the movable bar of the ink cartridge attached to the cartridge-receiving section. Thus, the ink cartridge is determined to have been attached to the cartridge-receiving section when the sensor detects the movable bar. However, if the ink cartridge whose ink has been consumed were to be attached to the cartridge-receiving section, the sensor does not detect the movable bar since the pivoting posture of the movable bar has changed due to the little amount of residual ink. Thus, attachment of the ink cartridge to the cartridge-receiving section cannot be accurately detected by means of the movable bar, if the attached ink cartridge has little amount of ink left therein.

In view of the foregoing, it is an object of the present disclosure to provide a liquid cartridge that enables accurate detection of a residual amount of liquid, and that realizes detection of attachment thereof to the cartridge-receiving section independently of the detection of the residual amount of liquid.

In order to attain the above and other objects, the present disclosure provides a liquid cartridge including a cartridge body, a liquid-supply part, a deformable member and a detection member. The cartridge body defines a liquid chamber configured to store liquid therein, the liquid chamber being configured such that an internal pressure of the liquid chamber is reduced in accordance with outflow of the liquid from the liquid chamber. The liquid-supply part is configured to allow the liquid to flow out of the liquid chamber. The deformable member protrudes upward relative to the cartridge body in an attached posture of the liquid cartridge, the deformable member defining an inner space in communication with the liquid chamber, the deformable member being deformable such that a volume of the inner space is reduced in accordance with the reduction in the internal pressure of the liquid chamber. The detection member has a detected part subject to external detection, the detected part being movable from a first position to a second position different from the first position, the detected part at the second position being in contact with the deformable member, the detected part being further movable from the second position to a third position below the second position in accordance with deformation of the deformable member.

BRIEF DESCRIPTION OF THE DRAWINGS

In the drawings:

FIG. 7 is a block diagram showing electrical interactions of a controller 1 of the printer 10;

FIG. 9 is a flowchart explaining processes performed by the controller 1 to determine whether the ink cartridge 30 according to the first embodiment has been mounted in the cartridge-receiving section 110;

FIGS. 10A through 10D are vertical cross-sectional views conceptually illustrating an internal state of an ink cartridge 230 according to a second embodiment of the present disclosure, wherein FIG. 10A illustrates a state where an opening 258 is opened; FIG. 10B illustrates a state where the opening 258 is closed; FIG. 10C illustrates a state where pressure within an ink flow path 244 has become negative; and FIG. 10D illustrates a state where an opening 255 is opened.

DETAILED DESCRIPTION

Figure 1:
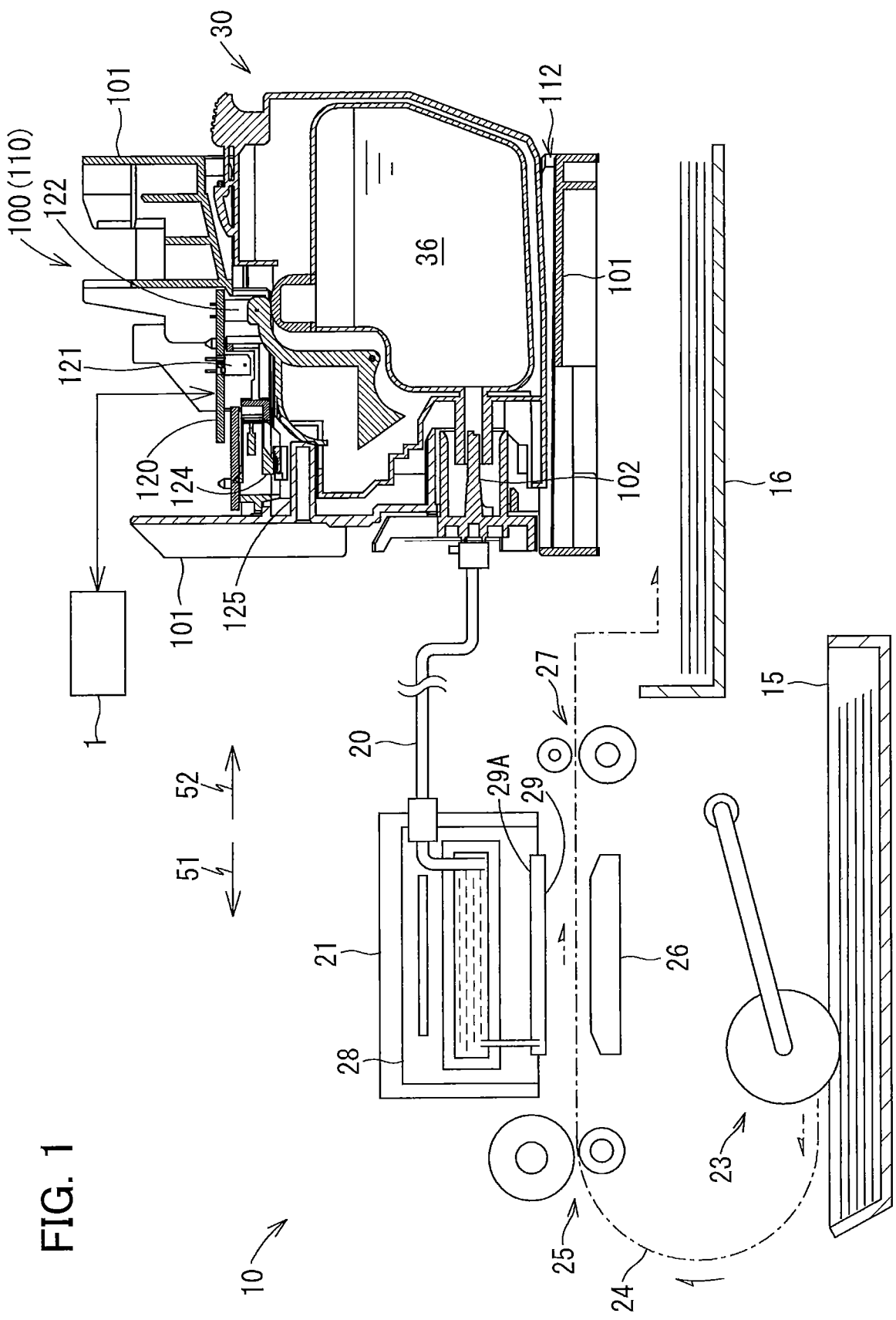
FIG. 1 is a cross-sectional diagram conceptually showing an internal configuration of a printer 10 provided with a cartridge-receiving section 110 that detachably accommodates an ink cartridge 30 according to a first embodiment of the present disclosure.

Hereinafter, while the disclosure is described in detail with reference to the specific embodiments thereof while referring to accompanying drawings, it would be apparent to those skilled in the art that many modifications and variations may be made therein without departing from the scope of the disclosure.

In the following description, a frontward direction 51 is defined as a direction that an ink cartridge 30 according to a first embodiment is inserted into a cartridge-receiving section 110, and a rearward direction 52 is defined as a direction opposite the frontward direction 51, that is, a direction in which the ink cartridge 30 is extracted from the cartridge-receiving section 110. While the frontward direction 51 and rearward direction 52 are horizontal directions in the present embodiment, the frontward direction 51 and rearward direction 52 need not be horizontal directions.

Further, an upward direction 54 is defined as a direction perpendicular to the frontward and rearward directions 51 and 52, and a downward direction 53 is defined as a direction opposite the upward direction 54. While the upward direction 54 is vertically upward and the downward direction 53 is vertically downward in the present embodiment, the upward and downward directions 54 and 53 need not be vertical directions.

Further, a rightward direction 55 and a leftward direction 56 are defined as directions perpendicular to the frontward direction 51 and the downward direction 53. More specifically, when the ink cartridge 30 has been received in the cartridge-receiving section 110, i.e., when the ink cartridge 30 is in an attached posture, and when a user views the ink cartridge 30 in the frontward direction 51, i.e., when the user views the ink cartridge 30 from its rear side, the rightward direction 55 is a direction toward the right and the leftward direction 56 is a direction toward the left. While the rightward and leftward directions 55 and 56 are horizontal directions in the present embodiment, the rightward and leftward directions 55 and 56 need not be horizontal directions.

1. First Embodiment

The ink cartridge 30 according to the first embodiment of the present disclosure will be described while referring to FIGS. 1 through 9.

Overview of Printer 10

First, a printer 10 adapted to use the ink cartridge 30 will be described with reference to FIG. 1.

The printer 10 is configured to form an image by selectively ejecting ink droplets onto a sheet based on an ink jet recording system. As shown in FIG. 1, the printer 10 includes a recording head 21, an ink-supplying device 100, and an ink tube 20 connecting the recording head 21 to the ink-supplying device 100. The ink-supplying device 100 includes the cartridge-receiving section 110. The cartridge-mounting section 110 can detachably receive the ink cartridge 30 (an example of a liquid cartridge) therein.

Specifically, the cartridge-receiving section 110 has one side formed with an opening 112. The ink cartridge 30 can be inserted into the cartridge-mounting section 110 in the frontward direction 51 through the opening 112, and extracted from the cartridge-receiving section 110 in the rearward direction 52 through the opening 112.

The ink cartridge 30 stores ink therein that the printer 10 can use for printing. The ink cartridge 30 is connected to the recording head 21 through the ink tube 20 when the ink cartridge 30 has been completely mounted in the cartridge-receiving section 110.

In the printer 10 of the present embodiment, the cartridge-receiving section 110 can accommodate therein four kinds of ink cartridges 30 corresponding to four colors of cyan, magenta, yellow and black, respectively. However, for simplifying explanation, only one ink cartridge 30 is assumed to be mounted in the cartridge-receiving section 110 in FIG. 1 and explanations therefor.

The recording head 21 has a sub tank 28 for temporarily storing ink supplied from the ink cartridge 30 through the ink tube 20. The recording head 21 also includes a plurality of nozzles 29 through which the ink supplied from the sub tank 28 is selectively ejected in accordance with the ink jet recording system. More specifically, the recording head 21 includes a head control board (not shown), and piezoelectric elements 29A corresponding one-on-one to the nozzles 29. The head control board is configured to selectively apply drive voltages to the piezoelectric elements 29A in order to eject ink selectively from the nozzles 29.

The printer 10 also includes a sheet tray 15, a sheet feeding roller 23, a conveying path 24, a pair of conveying rollers 25, a platen 26, a pair of discharge rollers 27, and a sheet discharge tray 16. The sheet feeding roller 23 is configured to feed sheets of paper from the sheet tray 15 onto the conveying path 24, and the conveying rollers 25 are configured to convey the sheets over the platen 26. The recording head 21 is configured to selectively eject ink onto the sheets as the sheets move over the platen 26, whereby images are recorded on the sheets. That is, the ink stored in the ink cartridge 30 that has been completely mounted in the cartridge-mounting section 110 can be consumed by the recording head 21. The discharge rollers 27 are adapted to receive the sheets that have passed over the platen 26 and are configured to discharge the sheets onto the sheet discharge tray 16 disposed on a downstream end of the conveying path 24.

Ink-Supplying Device 100

The ink-supplying device 100 is provided in the printer 10, as shown in FIG. 1. The ink-supplying device 100 functions to supply ink to the recording head 21. As described above, the ink-supplying device 100 includes the cartridge-receiving section 110 for detachably receiving the ink cartridge 30. FIG. 1 shows a state where the ink cartridge 30 has been completely received in the cartridge-receiving section 110.

Cartridge-Receiving Section 110

Figure 2:
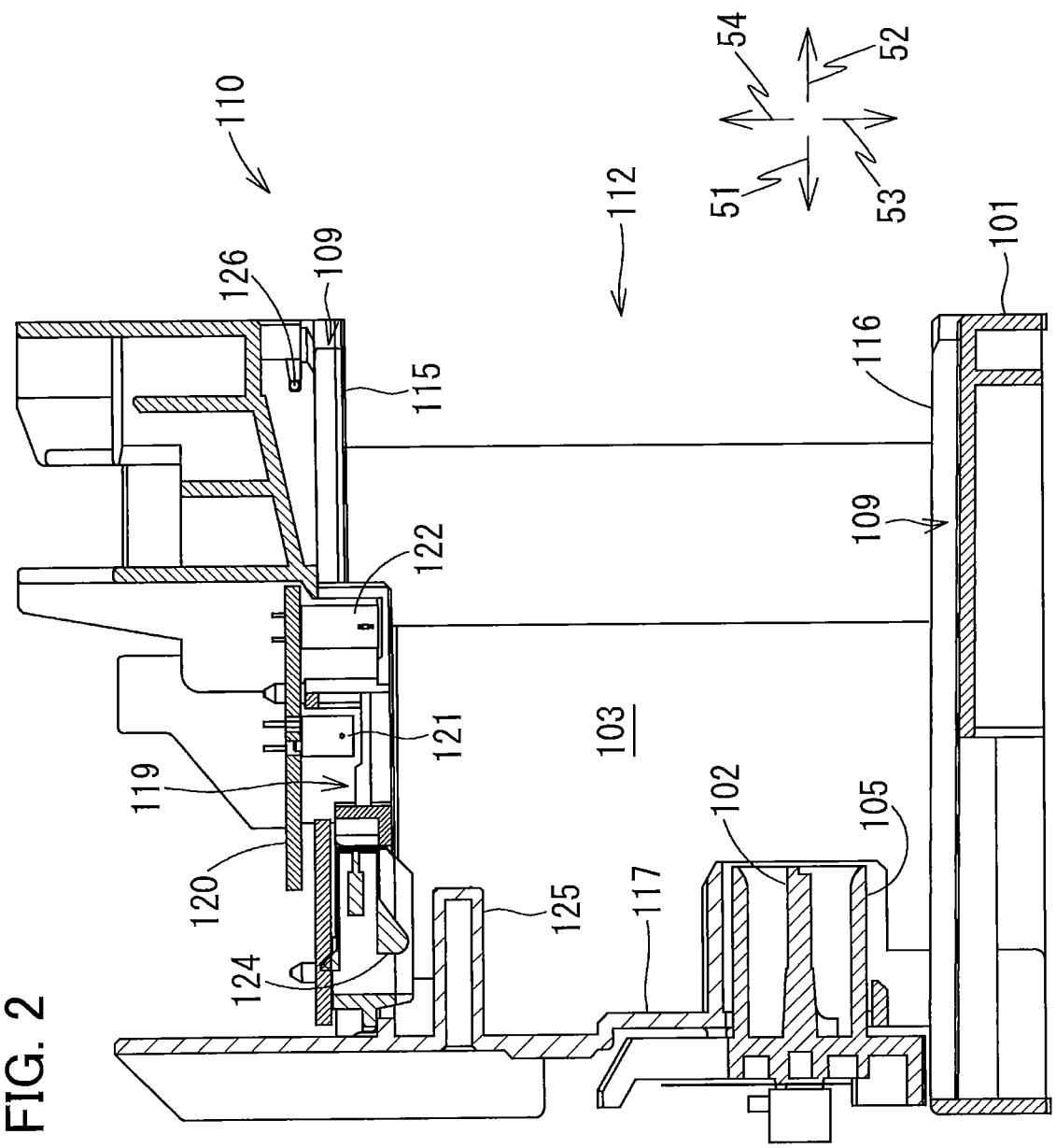
FIG. 2 is a vertical cross-sectional view showing an internal configuration of the cartridge-receiving section 110.

The cartridge-receiving section 110 includes a case 101, and four sets of an ink needle 102, a substrate 120, a first optical sensor 121, a second optical sensor 122, and an abutting part 125 (see FIG. 2). The cartridge-receiving section 110 also includes a plurality of contacts 124 only one of which is illustrated in FIG. 2.

The case 101 has a box-like shape and defines an internal space 103 therein (see FIG. 2). The internal space 103 is partitioned into four individual spaces arranged in the rightward direction 55 and leftward direction 56. In each of these four spaces, the four kinds of ink cartridges 30 corresponding to four colors of cyan, magenta, yellow and black can be received, respectively. Each internal space 103 is an example of a cartridge accommodation space.

Each of the four ink needles 102, four substrates 120, four first optical sensors 121, four second optical sensors 122 and four abutting parts 125 are provided corresponding to each of the ink cartridges 30. That is, the four ink needles 102, four substrates 120, four first optical sensors 121, four second optical sensors 122 and four abutting parts 125 are provided respectively to be aligned with one another in the rightward direction 55 and leftward direction 56. Further, the four ink needles 102, four substrates 120, four first optical sensors 121, four second optical sensors 122 and four abutting parts 125 have the same configurations as one another, respectively. Hence, hereinafter, for simplifying explanation, only one each of the four ink needles 102, four substrates 120, four first optical sensors 121, four second optical sensors 122 and four abutting parts 125 will be described, while descriptions for remaining three each thereof will be omitted.

Case 101

The case 101 defines an outer shape of the cartridge-receiving section 110. Specifically, the case 101 includes a top wall 115, a bottom wall 116, and an end wall 117 connecting the top wall 115 and the bottom wall 116. The case 101 is formed with the opening 112. Specifically, the top wall 115 and the bottom wall 116 define a ceiling and a bottom of the internal space 103 of the case 101, respectively. The end wall 117 defines an end of the internal space 103 of the case 101 in the frontward direction 51. That is, the opening 112 is arranged to face the end wall 117 in the rearward direction 52. The opening 112 can be exposed to a surface (user-interface surface) that a user can face when using the printer 10.

As show in FIG. 2, the top wall 115 is formed with four upper guide grooves 109 aligned with each other in the rightward and leftward directions 55 and 56, while the bottom wall 116 is formed with four lower guide grooves 109 aligned with each other in the rightward and leftward directions 55 and 56. When the ink cartridge 30 is inserted into and removed from the case 101 through the opening 112, upper and lower portions of the ink cartridge 30 are respectively guided by the corresponding upper and lower guide grooves 109 in the frontward direction 51 and rearward direction 52. The case 101 further includes three partitioning plates (not shown) partitioning the internal space 103 of the case 101 into four individual spaces elongated in the downward direction 53 and upward direction 54. The ink cartridge 30 can be detachably accommodated in the corresponding space defined in the case 101.

The opening 112 of the case 101 can be opened and closed by a cover (not illustrated). This cover is attached to a pivot shaft (not illustrated) that extends in the rightward direction 55 and leftward direction 56 and is arranged in the vicinity of a lower end of the opening 112. With this configuration, the cover is pivotally movable about an axis of the pivot shaft between a closing position closing the opening 112 and an opening position opening the opening 11. When the cover is in the opening position, the user can insert/remove the ink cartridge 30 into/from the case 101 through the opening 112. When the cover is in the closing position, the user cannot insert and remove the ink cartridge 30 into/from the case 101; and the user cannot have access to the ink cartridge 30 accommodated in the case 101.

In the vicinity of an upper end of the opening 112 of the case 101, a cover sensor 118 (see FIG. 7) is provided. The cover sensor 118 can detect whether or not the cover sensor 118 is in abutment with the not-illustrated cover. When the cover is at the closing position, the cover sensor 118 is in contact with an upper end portion of the cover, and the cover sensor 118 thus outputs a detection signal to a controller 1. When the cover is not located at the closing position, the cover sensor 118 does not output the detection signal.

Ink Needle 102

As shown in FIG. 2, the ink needle 102 is disposed on a lower end portion of the end wall 117 of the case 101. The ink needle 102 is formed of resin and has a generally tubular shape. Specifically, the ink needle 102 is disposed at the end wall 117 at a position corresponding to an ink supply part 34 (described later) of the ink cartridge 30 mounted in the cartridge-receiving section 110. The ink needle 102 extends (protrudes) in the rearward direction 52 from the end wall 117.

A cylindrical-shaped guide part 105 is provided to surround the ink needle 102. The guide part 105 protrudes in the rearward direction 52 from the end wall 117 and has an open protruding end. Specifically, the ink needle 102 is positioned at a center of the guide part 105. The guide part 105 is thus formed to allow the ink supply part 34 of the ink cartridge 30 to be received in the guide part 105.

During insertion of the ink cartridge 30 into the cartridge-receiving section 110 in the frontward direction 51, i.e., in the course of action of the ink cartridge 30 moving to a mounted position received in the cartridge-receiving section 110, the ink supply part 34 of the ink cartridge 30 enters into the corresponding guide part 105. As the ink cartridge 30 is inserted further in the frontward direction 51, the ink needle 102 enters into an ink supply port 71 (see FIG. 3) of the ink supply part 34, thereby connecting the ink needle 102 and the ink supply part 34. Hence, the ink stored in an ink chamber 36 (see FIG. 3) formed in the ink cartridge 30 can flow into the ink tube 20 connected to the ink needle 102 through an internal space of the ink supply part 34 and an internal space formed in the ink needle 102. The ink needle 102 may have a flat-shaped tip end or a pointed tip end.

Substrate 120, First Optical Sensor 121, and Second Optical Sensor 122

As illustrated in FIG. 2, the substrate 120 is arranged near the top wall 115 of the case 101. An opening 119 is formed in a center portion of the top wall 115 in the frontward direction 51 and rearward direction 52. The substrate 120 is exposed to the internal space 103 of the case 101 through the opening 119. The substrate 120 is made of a glass-epoxy, for example.

The first and second optical sensors 121 and 122 are mounted on the substrate 120. The first optical sensor 121 is disposed further in the forward direction 51 (i.e., frontward) relative to the second optical sensor 122. The first and second optical sensors 121 and 122 extend downward from the substrate 120 to enter into the internal space 103 of the case 101 through the opening 119.

The first optical sensor 121 includes a light-emitting part and a light-receiving part. The light-emitting part and light-receiving part are arranged to face each other in the rightward direction 55 and leftward direction 56. The light-emitting part is disposed at a right end portion defining the corresponding one of the four spaces in the internal space 103. The light-receiving part is disposed at a left end portion defining the corresponding one of the four spaces in the internal space 103. The right and left positions of the respective light-emitting part and light-receiving part may be arranged in reverse.

The second optical sensor 122 includes a light-emitting part and a light-receiving part. The light-emitting part and light-receiving part are arranged to face each other in the rightward direction 55 and leftward direction 56. The light-emitting part is disposed at the right end portion defining the corresponding one of the four spaces in the internal space 103. The light-receiving part is disposed at the left end portion defining the corresponding one of the four spaces in the internal space 103. The right and left positions of the respective light-emitting part and light-receiving part may be arranged in reverse.

The first and second optical sensors 121 and 122 are electrically connected to the controller 1 (see FIGS. 1 and 7) of the printer 10 through electric circuits. Details of the controller 1 will be described later.

Abutting Part 125

As illustrated in FIG. 2, the abutting part 125 (an example of a protruding part) is provided on the end wall 117 at a position near the top wall 115. The abutting part 125 protrudes in the rearward direction 52 from the end surface 117 of the case 101. The abutting part 125 can abut against a leaf spring 96 (see FIG. 3) of the ink cartridge 30 during insertion of the ink cartridge 30 into the cartridge-receiving section 110.

Contact 124

As illustrated in FIG. 2, a plurality of contacts 124 is provided on the top surface 115 of the case 101 at a position above the abutting part 125. The contacts 124 can be electrically connected to electrodes 67 (see FIG. 3) of an IC board 66 of the ink cartridge 30 attached to the cartridge-receiving section 110. The number and arrangement of the contacts 124 are determined to correspond to the number and arrangement of the electrodes 67. The controller 1 (described later) can be thus electrically connected to the IC board 66 through the contacts 124.

Lock Bar 126

As illustrated in FIG. 2, a lock bar 126 is provided near the top wall 115 and the opening 112 so as to extend in the rightward direction 55 and leftward direction 56. The lock bar 126 is a bar-like member extending in the rightward direction 55 and leftward direction 56. For example, the lock bar 126 is a metal columnar member. The lock bar 126 has both ends in the rightward direction 55 and leftward direction 56 that are respectively fixed to walls defining both ends of the case 101 in the rightward direction 55 and leftward direction 56.

The lock bar 126 functions to retain the ink cartridge 30 attached to the cartridge-receiving section 110 at its mounted position. The ink cartridge 30 that has been inserted in the cartridge-receiving section 110 is engaged with the lock bar 126. The inserted ink cartridge 30 is thus retained in the cartridge-receiving section 110.

Ink Cartridge 30

The ink cartridge 30 is configured to be inserted into and mounted in the cartridge-receiving section 110 in the frontward direction 51. The ink cartridge 30 is also configured to be removed from the cartridge-receiving section 110 in the rearward direction 52. The frontward direction 51 and the rearward direction 52 are horizontal in the present embodiment.

Figure 3:
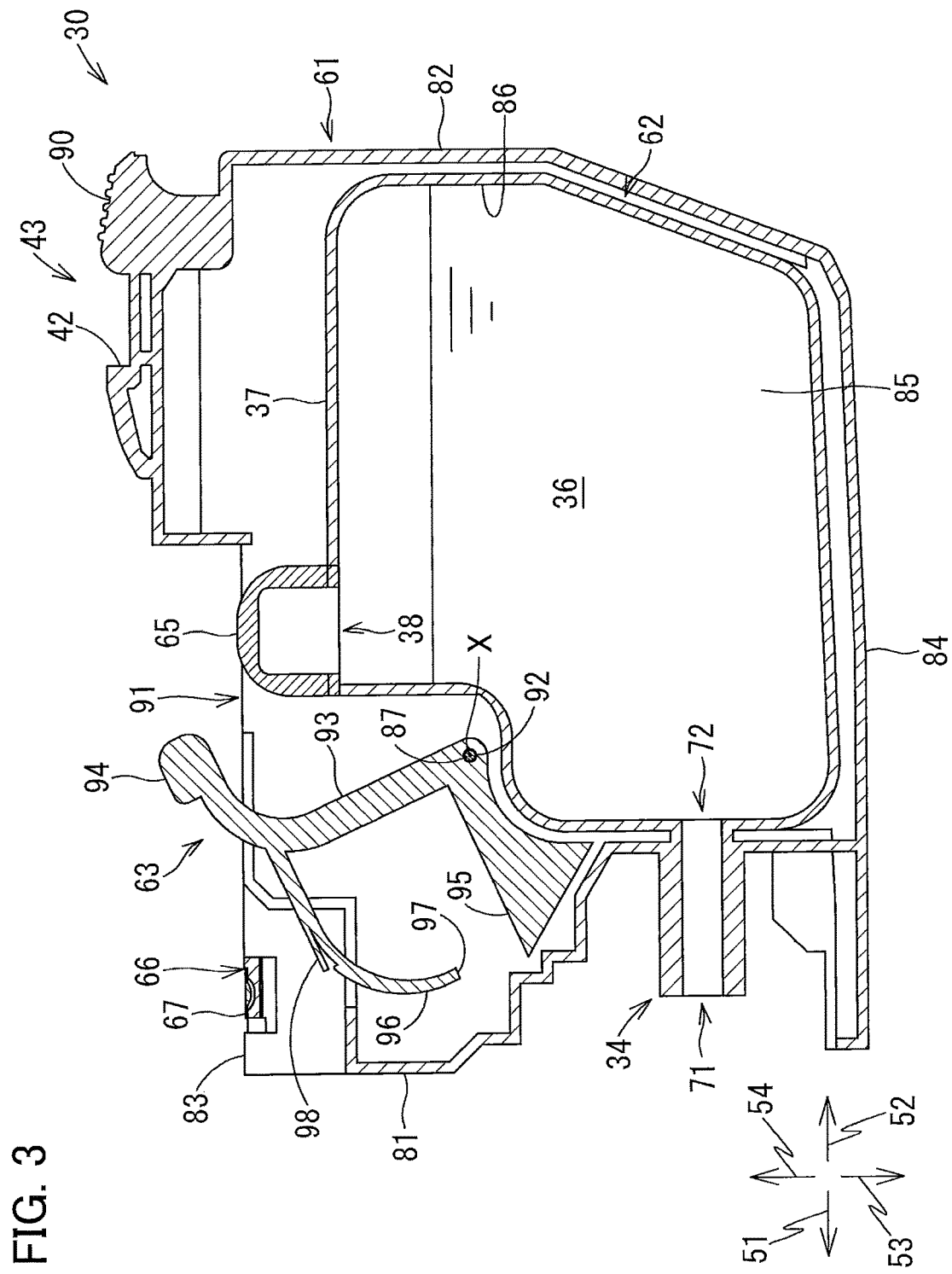
FIG. 3 is a vertical cross-sectional view showing an internal configuration of the ink cartridge 30 according to the first embodiment.

The ink cartridge 30 is a container configured to store ink therein. As shown in FIG. 3, the ink cartridge 30 includes a cartridge body 61, a detection member 63, and a deformable member 65.

Cartridge Body 61

Figure 5:
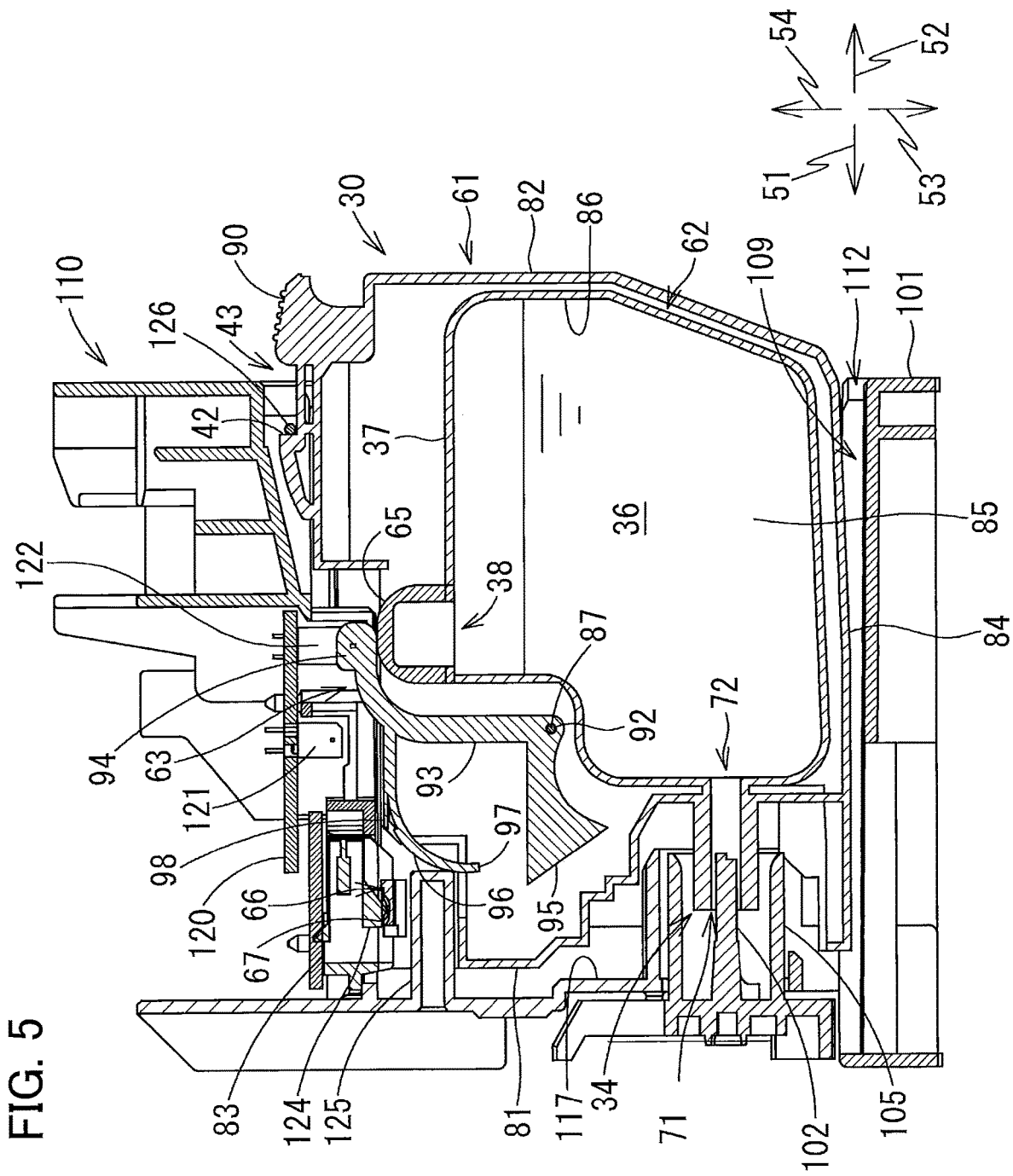
FIG. 5 is a vertical cross-sectional view illustrating the positional relationship of the ink cartridge 30 of the first embodiment relative to the first optical sensor 121 and the second optical sensor 122 of the cartridge-receiving section 110 when the ink cartridge 30 has been mounted in the cartridge-receiving section 110.
Figure 6:
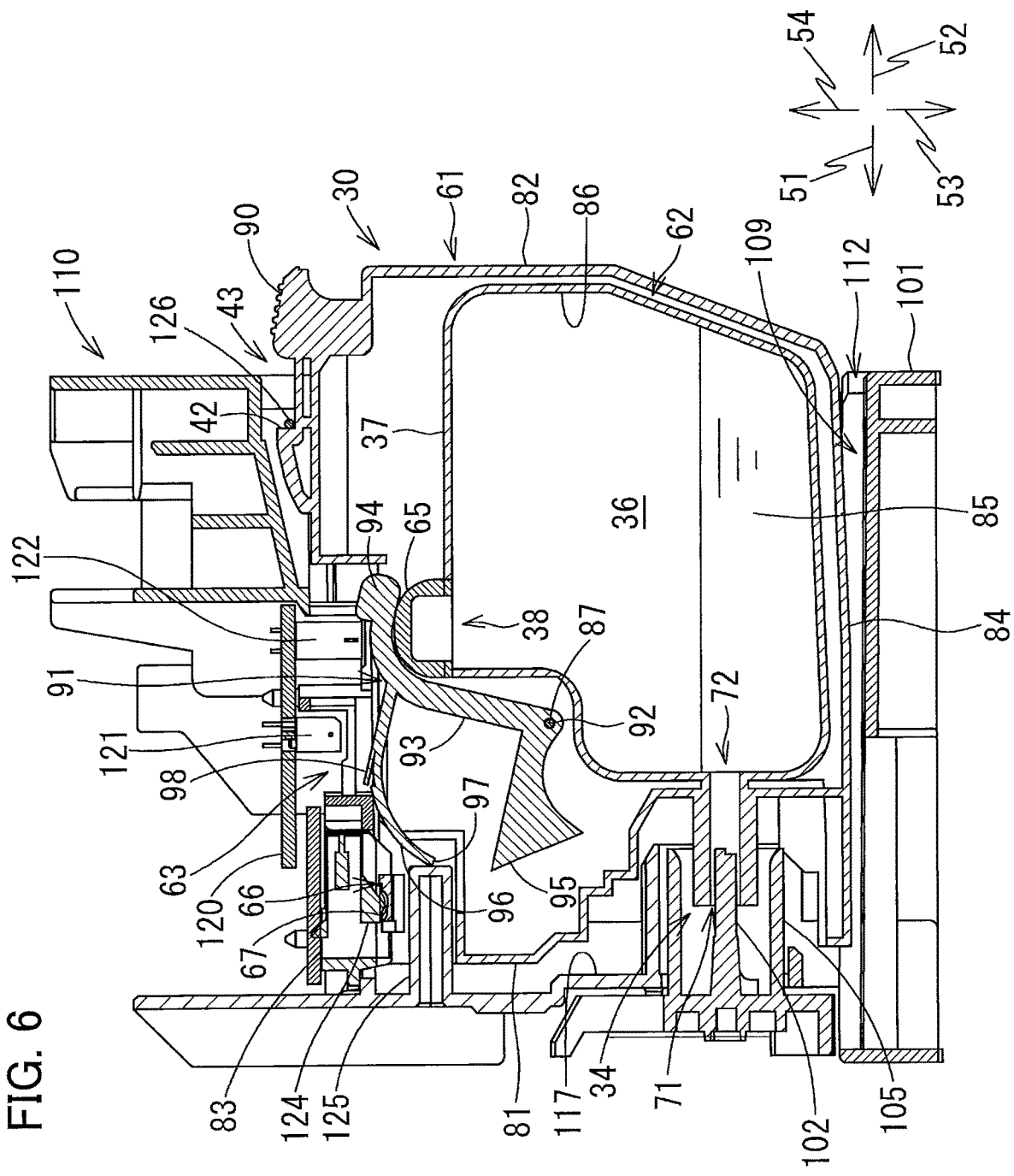
FIG. 6 is a vertical cross-sectional view illustrating the positional relationship of the ink cartridge 30 of the first embodiment relative to the first optical sensor 121 and the second optical sensor 122 of the cartridge-receiving section 110 when a prescribed amounted of ink has been consumed since the ink cartridge 30 was mounted in the cartridge-receiving section 110.

The cartridge body 61 shown in FIG. 3 constitutes an outer shape of the ink cartridge 30. The cartridge body 61 is in the orientation shown in FIG. 3 when the ink cartridge 30 is attached to the cartridge-receiving section 110 (in the attached posture), as shown in FIGS. 5 and 6. In the attached posture of the ink cartridge 30, the cartridge body 61 has a generally flat shape having a height in the downward direction 53 and upward direction 54, a width in the rightward direction 55 and leftward direction 56, and a length in the frontward direction 51 and rearward direction 52, the width being smaller than the height and the length. That is, the cartridge body 61 has the length in the frontward direction 51 and rearward direction 52 that is horizontal in the attached posture of the ink cartridge 30.

The cartridge body 61 includes a front wall 81, a rear wall 82, an upper wall 83, a lower wall 84, and a pair of side walls (not illustrated). The front wall 81 (an example of a front wall) faces in the frontward direction 51. That is, the front wall 81 is a wall configured to face the end wall 117 of the cartridge-receiving section 110 in the frontward direction 51 when the ink cartridge 30 has been attached to the cartridge-receiving section 110 (in the attached posture). The rear wall 82 (an example of a rear wall) is arranged further in the rearward direction 52 (i.e., rearward) relative to the front wall 81 to oppose the front wall 81 in the frontward direction 51 and the rearward direction 52. The upper wall 83 (an example of an upper wall) connects upper end portions of the front wall 81, the rear wall 82, and the two side walls. The lower wall 84 connects lower end portions of the front wall 81, the rear wall 82 and the two side walls. The side walls constitute right and left surfaces of the cartridge body 61, respectively. The front wall 81, rear wall 82, upper wall 83, lower wall 84, and the two side walls define an internal space of the ink cartridge 30.

In the attached posture, the upper wall 83 extends horizontally. The upper wall 83 has a stepped structure. More specifically, due to a step formed on the upper wall 83, a rearward portion of the upper wall 83 (a portion arranged rearward of the step) is formed to be higher than a frontward portion of the upper wall 83 (a portion arranged frontward of the step). On the rearward portion of the upper wall 83, a lock part 43 is provided to protrude in the upward direction 54 therefrom. The lock part 43 is disposed on the rearward portion (higher portion) of the upper wall 83 to extend in the frontward direction 51 and rearward direction 52. The lock part 43 is positioned further in the rearward direction 52 relative to the deformable member 65 (described later). The lock part 43 has a locking surface 42 that faces in the rearward direction 52. The locking surface 42 extends in the downward direction 53 and upward direction 54. The locking surface 42 is a surface that can contact the lock bar 126 of the cartridge-receiving section 110 in the rearward direction 52 when the ink cartridge 30 has been attached to the cartridge-receiving section 110. When the locking surface 42 contacts the lock bar 126 in the rearward direction 52, the lock part 43 and lock bar 126 are engaged with each other, thereby keeping the ink cartridge 30 mounted in the cartridge-receiving section 110.

An operation part 90 is further provided on the rearward portion of the upper wall 83 at a position further in the rearward direction 52 (i.e., rearward) relative to the locking surface 42. The user operates the operation part 90 to remove the ink cartridge 30 out of the cartridge-receiving section 110.

On the frontward portion of the upper wall 83, a through-hole 91 is formed. Specifically, the through-hole 91 is defined by the upper wall 83 and the side walls. The through-hole 91 is formed to extend in the frontward direction 51 and rearward direction 52. Specifically, the through-hole 91 has a front-rear dimension that is longer than a movable range of an extending part 93 of the detection member 63 (described later) in the frontward direction 51 and rearward direction 52. As will be described later, the extending part 93 of the detection member 63 extends upward to penetrate the through-hole 91 from below and protrudes upward in the upward direction 54 beyond the upper wall 83 through the through-hole 91.

On the upper wall 83 of the cartridge body 61, the IC board 66 is also disposed. The IC board 66 is arranged further in the frontward direction 51 (i.e., frontward) relative to the detection member 63. Four electrodes 67 are provided on an upper surface of the IC board 66. The electrodes 67 extend in the frontward direction 51 and rearward direction 52 and are arranged in separation from one another in the rightward direction 55 and leftward direction 56. The electrodes 67 are, for example, a HOT electrode, a GND electrode, and a signal electrode. The IC board 66 also includes an IC (not illustrated) that is electrically connected to the respective electrodes 67. The IC is a semiconductor integrated circuit, and stores therein data indicative of a type of the ink cartridge 30, such as a lot number and a manufactured date, for example. The data stored in the IC is retrievable from outside. Specifically, when the ink cartridge 30 is attached to the cartridge-receiving section 110, the IC is electrically connected to the controller 1 of the printer 10 through the electrodes 67. In this state, the controller 1 (see FIGS. 1 and 7) can retrieve the data stored in the IC board 66, and specify the type of the attached ink cartridge 30 based on the data read out from the IC board 66.

Further, a reservoir 62 is accommodated in the cartridge body 61. The reservoir 62 (an example of a reservoir) includes a peripheral wall 86, a side wall 85 and a film (not illustrated). The peripheral wall 86 has a generally endless shape in a side view. The side wall 85 constitutes a right end of the reservoir 62. The peripheral wall 86 protrudes from the side wall 85 in the leftward direction 56. The film is welded to a protruding end (left end) of the peripheral wall 86 and constitutes a left end of the reservoir 62. A space enclosed by the peripheral wall 86, film (not shown), and side wall 85 serves as the ink chamber 36. Put another way, the peripheral wall 86 defines upper, lower, front, and rear surfaces of the ink chamber 36, while the side wall 85 and the film respectively define right and left surfaces of the ink chamber 36. Ink is stored in the ink chamber 36 (an example of a liquid chamber).

When pressure inside the ink chamber 36 becomes lower than pressure outside thereof, the film deforms in the rightward direction 55 such that a volume of the ink chamber 36 is reduced. That is, the reservoir 62 has flexibility. The pressure inside the ink chamber 36 in its initial state may be equal to atmospheric pressure or smaller than atmospheric pressure (i.e., decompressed state), provided that the deformable member 65 can maintain its inflated state.

While the reservoir 62 of the present embodiment is configured of the peripheral wall 86, film and side wall 85, the reservoir 62 may be formed as a resin bag, for example. Still alternatively, the reservoir 62 may be formed as a part of the cartridge body 61, or may be formed separately from the cartridge body 61.

Incidentally, the front surface, rear surface, upper surface, lower surface, and side surfaces of the ink cartridge 30 need not be configured as one plane, respectively. That is, the front surface of the ink cartridge 30 can be any surface(s) that can be seen when the ink cartridge 30 is viewed in the rearward direction 52; and that is (are) positioned frontward relative to a front-rear center of the ink cartridge 30. The rear surface of the ink cartridge 30 can be any surface(s) that can be seen when the ink cartridge 30 is viewed in the forward direction 51; and that is(are) positioned rearward relative to the front-rear center of the ink cartridge 30. The upper surface of the ink cartridge 30 can be any surface(s) that can be seen when the ink cartridge 30 is viewed in the downward direction 53; and that is(are) positioned upward relative to a center of the ink cartridge 30 in the upward direction 54 and downward direction 53. The lower surface of the ink cartridge 30 can be any surface(s) that can be seen when the ink cartridge 30 is viewed in the upward direction 54; and that is positioned downward relative to the center of the ink cartridge 30 in the upward direction 54 and downward direction 53. The same is applied to the side surfaces. That is, while the rearward portion of the upper wall 83 that is positioned rearward of the step is disposed higher than the frontward portion of the upper wall 83 in the present embodiment, the upper wall 83 may be configured to have no level difference in the upward direction 54 and downward direction 53.

The ink supply part 34 (an example of a liquid-supply part) is provided on a lower portion of the front wall 81 to protrude in the forward direction 51 therefrom. The ink supply part 34 has a generally cylindrical shape and has an inner space defined therein. The ink supply part 34 has a front end (protruding end) in which an ink supply port 71 is formed. The ink supply port 71 provides communication between the inner space of the ink supply part 34 and outside of the ink cartridge 30. The ink supply part 34 has a base end (rear end) formed with an opening 72. The opening 72 provides communication between the inner space of the ink supply part 34 and the ink chamber 36.

Within the inner space of the ink supply part 34, a valve (not shown) is disposed. As a default state, the valve is in a closed state to prevent the ink in the ink chamber 36 from flowing out of the ink cartridge 30. However, during insertion of the ink cartridge 30 into the cartridge-receiving section 110 in the forward direction 51, the valve is pushed by the ink needle 102 being inserted into the inner space of the ink supply part 34 through the ink supply port 71, thereby turning the valve into an open state. When the valve is opened, the ink stored in the ink chamber 36 can flow into the ink tube 20 connected to the ink needle 102 through the inner space of the ink supply part 34 and the internal space of the ink needle 102.

Note that the ink needle 102 has a side surface formed with an opening. Through this opening, the ink in the inner space of the ink supply part 34 can enter into the internal space of the ink needle 102.

The ink supply part 34 is not limited to the depicted configuration having the valve. Instead, for example, the ink supply port 71 may be closed by a film or the like. In this case, the ink needle 102 may break through the film at the time of insertion of the ink cartridge 30 into the cartridge-receiving section 110, thereby allowing a tip end of the ink needle 102 to enter into the inner space of the ink supply part 34 through the ink supply port 71.

Detection Member 63

The detection member 63 is movably supported by the cartridge body 61. Specifically, as illustrated in FIG. 3, the detection member 63 is provided such that a major portion thereof, except an upper end portion of the detection member 63, is accommodated inside the cartridge body 61. The major portion of the detection member 63 is disposed within the cartridge body 61 at a position where the reservoir 62 is not present, i.e., at a position upward and frontward of the reservoir 62 within the cartridge body 61. A shaft hole 92 is formed in the detection member 63 for receiving a shaft bar 87 provided on the side walls of the cartridge body 61.

More specifically, the shaft bar 87 is supported by upper front portions of the side walls constituting the cartridge body 61. The shaft bar 87 extends in the rightward direction 55 and leftward direction 56. The shaft bar 87 is inserted into the shaft hole 92. With this configuration, the detection member 63 is supported by the cartridge body 61 so as to be pivotally movable about a center of the shaft hole 92 (i.e., axis X of the shaft bar 87, shown in FIG. 3). This axis X of the shaft bar 87 is an example of a pivot shaft.

The detection member 63 includes the extending part 93, a detected part 94 subject to external detection, a weight part 95 (an example of a weight), and the leaf spring 96 (an example of an urging member) made of resin. In the present embodiment, the detection member 63 is integrally molded by resin, but the detection member 63 need not be integrally molded. For example, the extending part 93 and detected part 94 may be connected by means of fitting one to the other. In the following description of the detection member 63, directions are defined assuming that the detection member 63 is in a state illustrated in FIG. 4.

The extending part 93 generally extends in the upward direction 54 and downward direction 53. The shaft hole 92 is formed in a lower end portion of the extending part 93. The shaft hole 92 is a through-hole extending in the rightward direction 55 and leftward direction 56. The lower end portion of the extending part 93 is located below the upper wall 83 constituting the cartridge body 61 in the downward direction 53. The extending part 93 extends upward in the upward direction 54 from the lower end portion thereof to penetrate the through-hole 91 formed in the upper wall 83 from below. The extending part 93 has an upper end portion that is curved toward the rear in the rearward direction 52 as extending upward in the upward direction 54. The upper end portion of the extending part 93 protrudes upward in the upward direction 54 relative to the upper wall 83. That is, the upper end portion of the extending part 93 is located above the upper wall 83.

The detected part 94 is provided on the upper end portion of the extending part 93. That is, the detected part 94 is disposed further in the upward direction 54 (i.e., upward) relative to the cartridge body 61. In other words, the detected part 94 protrudes in the upward direction 54 relative to the cartridge body 61. More in detail, the detected part 94 is positioned above the upper wall 83 and higher than the IC board 66 in the upward direction 54. The detected part 94 has a plate-like shape extending in the frontward direction 51 and rearward direction 52 as well as in the upward direction 54 and downward direction 53. The detected part 94 is exposed upward so as to allow external and physical access thereto. However, the detected part 94 may be covered by a translucent cover, for example.

The detected part 94 can move in accordance with pivotal movement of the detection member 63. More specifically, the detected part 94 is movable from a first position illustrated in FIG. 4, to a second position illustrated in FIG. 5, and to a third position illustrated in FIG. 6. The detected part 94 at the second position is situated further in the downward direction 53 and further in the rearward direction 52 (i.e., downward and rearward) relative to the detected part 94 at the first position. The detected part 94 at the third position is situated further in the downward direction 53 and further in the rearward direction 52 (i.e., downward and rearward) relative to the detected part 94 at the second position.

Figure 4:
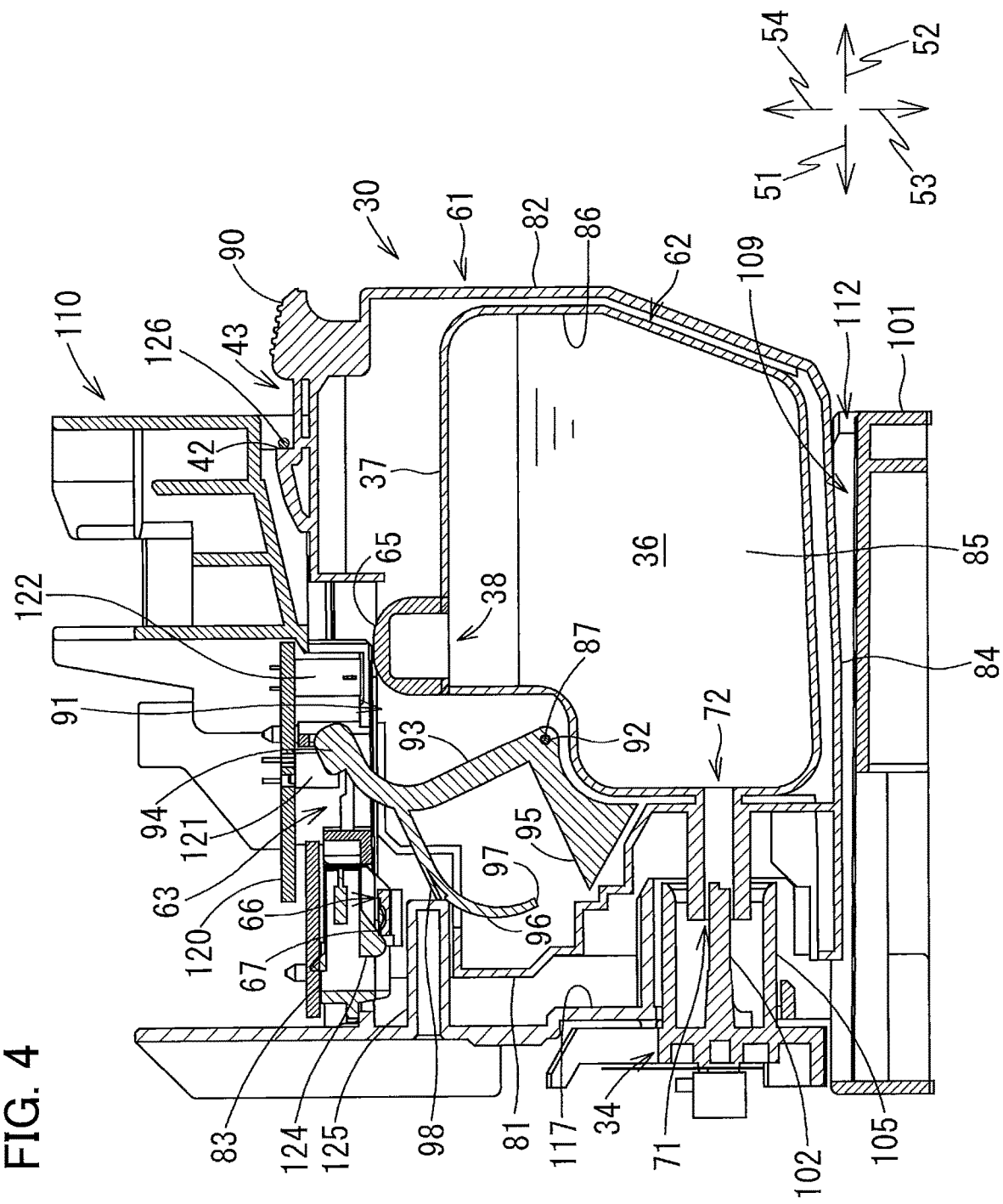
FIG. 4 is a vertical cross-sectional view illustrating a positional relationship of the ink cartridge 30 of the first embodiment relative to a first optical sensor 121 and a second optical sensor 122 of the cartridge-receiving section 110 while the ink cartridge 30 is being inserted into the cartridge-receiving section 110.

As illustrated in FIG. 4, the detected part 94 at the first position is located higher relative to the upper wall 83 of the cartridge body 61, and is located between the light-emitting part and light-receiving part of the first optical sensor 121. Accordingly, the detected part 94 at the first position can block light emitted from the light-emitting part of the first optical sensor 121. In this state, the detection member 63 is separated from the deformable member 65 (described later). Also, when the detected part 94 is at the first position, the leaf spring 96 contacts the abutting part 125.

As illustrated in FIG. 5, the detected part 94 at the second position is still positioned higher relative to the upper wall 83 of the cartridge body 61, and is now located between the light-emitting part and light-receiving part of the second optical sensor 122. Accordingly, the detected part 94 at the second position can block light emitted from the light-emitting part of the second optical sensor 122.

As illustrated in FIG. 6, the detected part 94 at the third position is neither situated between the light-emitting part and light-receiving part of the first optical sensor 121, nor between the light-emitting part and light-receiving part of the second optical sensor 122. That is, the detected part 94 at the third position is located offset from a path of the light emitted from the light-emitting part of the second optical sensor 122, or offset from a path of the light emitted from the first optical sensor 121. Thus, the detected part 94 at the third position neither blocks the light emitted from the light-emitting part of the first optical sensor 121 nor the light emitted from the light-emitting part of the second optical sensor 122.

Specifically, in the present embodiment, the light emitted from the respective light-emitting parts of the first optical sensor 121 and the second optical sensor 122 is incident on a right surface of the detected part 94, is outputted from a left surface of the detected part 94, and then reaches the corresponding light-receiving parts of the first optical sensor 121 and the second optical sensor 122. When the detected part 94 blocks the light, intensity of light received at the corresponding light-receiving parts (transmission state of the detected part 94) becomes less than a predetermined intensity, for example, zero. The detected part 94 may completely block the light traveling in the rightward direction 55 or leftward direction 56, or may partially absorb the light, may refract the light to change its traveling direction, or may fully reflect the light.

As illustrated in FIG. 3, the weight part 95 extends in the frontward direction 51 from the lower end portion of the extending part 93. That is, the weight part 95 is positioned further in the frontward direction 51 (i.e., frontward) relative to the shaft hole 92. Due to the weight of the weight part 95, the detection member 63 is urged to pivotally move in the frontward direction 51 (i.e., counterclockwise in FIG. 4). That is, the detected part 94 is urged toward the first position by the weight of the weight part 95. While the detected part 94 is urged toward the first position by the weight part 95 in the present embodiment, the weight part 95 may be dispensed with, provided that the detected part 94 can be urged toward the first position due to the position of the gravity center of the detection member 63 itself.

The leaf spring 96 protrudes in the frontward direction 51 from an intermediate portion of the extending part 93 between the lower and upper end portions of the extending part 93. That is, the leaf spring 96 is positioned further in the upward direction 54 and further in the frontward direction 51 (i.e., upward and frontward) relative to the shaft hole 92. The leaf spring 96 has a protruding end portion 97 (front end portion) that is curved toward the bottom in the downward direction 53. Further, in the present embodiment, the leaf spring 96 is provided with a contact part 98. The contact part 98 extends forward from a base end portion of the leaf spring 96. The contact part 98 has a leading end that is positioned above and rearward of a front end portion of the leaf spring 96, as shown in FIG. 4.

In the present embodiment, the contact part 98 and part of the leaf spring 96 can abut against the abutting part 125 of the cartridge-receiving section 110. In other words, in the present embodiment, the leaf spring 96 extends frontward and downward and is curved such that the leaf spring 96 is resiliently deformable upon contact against the abutting part 125. The contact of the leaf spring 96 against the abutting part 125 is an example of an external force applied to the urging member.

In a state shown in FIG. 4 (when the detection member 63 is at the first position), the contact part 98 abuts against the abutting part 125 of the cartridge-receiving section 110. Specifically, the leading end of the contact part 98 abuts against the abutting part 125 of the cartridge-receiving section 110. The contact of the contact part 98 against the abutting part 125 urges the detection member 63 to pivotally move clockwise in FIG. 4, thereby preventing the detection member 63 that has abutted against the abutting part 125 from being applied with an urging force acting counterclockwise in FIG. 4.

Preferably, the contact part 98 is preferably provided on the detection member 63. However, the contact part 98 may not be necessarily provided. Further, during insertion of the ink cartridge 30 into the cartridge-receiving section 110, the contact part 98 may abut against the abutting part 125 before or at the same time as the leaf spring 96 does.

In a state shown in FIG. 5 (when the detection member 63 is at the second position), the leaf spring 96 abuts against the abutting part of the cartridge-receiving section 110. At this time, the protruding end portion 97 of the leaf spring 96 forms a curve whose radius of curvature is smaller than a radius of curvature thereof in a state shown in FIG. 3 where the leaf spring 96 does not abut against the abutting part 125. That is, the leaf spring 96 is resiliently deformed. This resilient deformation of the leaf spring 96 generates an urging force that urges the detection member 63 as a whole in the rearward direction 52. In other words, an urging force that urges the detected part 94 toward the third position is generated in the leaf spring 96.

Note that the urging force of the leaf spring 96 that urges the detected part 94 toward the third position is larger than the urging force of the weight part 95 that urges the detected part 94 toward the first position.

With the above-described configuration, the leaf spring 96 can change its state between the state illustrated in FIG. 5 where the urging force is generated (deformed state) and the state illustrated in FIG. 3 where the urging force is not generated (non-deformed state).

Deformable Member 65

The deformable member 65 is disposed on an upper wall 37 constituting the peripheral wall 86. The deformable member 65 is formed of an elastic material such as silicone or rubber. As illustrated in FIG. 3, the deformable member 65 is opened in the downward direction 53 and has a dome-like shape that is inflated (swollen) in the upward direction 54. Specifically, the upper wall 37 is formed with a through-hole 38 through which the deformable member 65 is inserted from below. The deformable member 65 is inserted into the through-hole 38 from below and is brought into close contact with the upper wall 37 around the through-hole 38, thereby attaching the deformable member 65 to the upper wall 37.

In a state where the deformable member 65 is fitted to the upper wall 37, an upper end of the deformable member 65 is exposed outside through the through-hole 91 of the cartridge body 61. That is, as shown in FIG. 5, when the ink cartridge 30 is in the attached posture, the deformable member 65 protrudes upward relative to the upper wall 83 (more specifically, frontward portion of the upper wall 83) of the cartridge body 61. The deformable member 65 has an inner space that is communication with the ink chamber 36 through the through-hole 38. As the pressure inside the ink chamber 36 is reduced from the state shown in FIG. 5, the deformable member 65 is elastically deformed in the downward direction 53 such that a volume of the inner space thereof is reduced, as shown in FIG. 6. In other words, the deformable member 65 is elastically deformed such that inflation thereof in the upward direction 54 becomes smaller as the internal pressure of the ink chamber 36 is reduced.

The deformable member 65 is a film made of synthetic resin. The deformable member 65 has rigidity that is higher than rigidity of the film welded to the peripheral wall 86.

That is, when the pressure within the ink chamber 36 is reduced and the ink chamber 36 is decompressed in accordance with outflow of the ink in the ink chamber 36, the film welded to the peripheral wall 86 is first deformed inward before the deformable member 65 deforms. Also, the rigidity of the deformable member 65 is high enough not to allow the deformable member 65 to deform by the weight of the detection member 63 and/or the urging force of the leaf spring 96. That is, the deformable member 65 can maintain the detected part 94 at the second position, which is in contact with the deformable member 65, against the urging force of the leaf spring 96 as long as the internal pressure of the liquid chamber 36 is not less than a prescribed level. The deformable member 65 may be exposed outside the cartridge body 61, or may be housed in the cartridge body 61.

Controller 1

The printer 10 includes the controller 1 shown in FIG. 7. The controller 1 includes a CPU, a ROM and a RAM, for example. The controller 1 may be disposed within a housing of the printer 10 in a form of a control board to function as a controller of the printer 10. Alternatively, the controller 1 may be disposed on the case 101 in a form of a control board independent of the controller of the printer 10. The controller 1 is connected to the IC board 66, first optical sensor 121, and second optical sensor 122 so as to be capable of transmitting/receiving electrical signals therewith. Although not illustrated in FIG. 7, the controller 1 is connected to other components such as a motor and a touch panel so as to be capable of transmitting/receiving electrical signals therewith. The ROM stores a program to enable the controller 1 to execute various processing. The CPU performs computation for executing various processing based on the program stored in the ROM and issues instructions to the components connected to the controller 1. The RAM functions as a memory for temporarily storing various information therein.

The controller 1 is configured to detect that the ink cartridge 30 has been inserted in the cartridge-receiving section 110 upon detecting that a signal transmitted from the first optical sensor 121 has changed from high level to low level. Further, the controller 1 is configured to detect that the ink stored in the ink chamber 36 is running out upon detecting that a signal transmitted from the second optical sensor 122 has changed from low level to high level.

Movements of the Detection Member 63

Now, movements of the detection member 63 will be described with reference to FIGS. 2 to 8A.

First, how the detection member 63 moves during insertion of the ink cartridge 30 into the cartridge-receiving section 110 will be described.

As illustrated in FIG. 3, before the ink cartridge 30 is inserted into the cartridge-receiving section 110, the detected part 94 of the detection member 63 is retained at its first position in the ink cartridge 30. In this state, the valve in the ink supply part 34 is closed, thereby blocking ink flow from the ink chamber 36 to outside of the ink cartridge 30. Further, as illustrated in FIG. 2, before the ink cartridge 30 is inserted into the cartridge-receiving section 110, the detection member 63 is not located between the light-emitting part and light-receiving part of the first optical sensor 121. Thus, as indicated by an arrow A in FIG. 8A, a high-level signal is transmitted from the first optical sensor 121 to the controller 1. In the present embodiment, the signal transmitted from the first optical sensor 121 to the controller 1 is configured to be changed from high level to low level after the detection member 63 abuts against the abutting part 125 of the cartridge-receiving section 110. However, the signal from the first optical sensor 121 may be configured to switch from high level to low level before the detection member 63 abuts against the abutting part 125.

Incidentally, before the ink cartridge 30 is inserted into the cartridge-receiving section 110, the detection member 63 is not located between the light-emitting part and light-receiving part of the second optical sensor 122, either. Therefore, a high-level signal is transmitted from the second optical sensor 122 to the controller 1, although not shown in the drawings.

Subsequently, the cover of the cartridge-receiving section 110 is opened and the ink cartridge 30 is inserted into the cartridge-receiving section 110 as illustrated in FIG. 4. During this insertion process, the detected part 94 of the detection member 63 at the first position comes to a position between the light-emitting part and light-receiving part of the first optical sensor 121. Thus, the detected part 94 blocks the light emitted from the light-emitting part of the first optical sensor 121. As a result, as indicated by an arrow B in FIG. 8A, the signal transmitted from the first optical sensor 121 to the controller 1 is changed from high level to low level.

In the state shown in FIG. 4, the leaf spring 96 of the detection member 63 abuts against the abutting part 125. When the ink cartridge 30 is further inserted into the cartridge-receiving section 110 as shown in FIG. 5, the leading end portion 97 of the leaf spring 96 abuts against the abutting part 125, and the radius of curvature of the leading end portion 97 becomes smaller. Further, the extending part 93 is pivotally moved such that the detected part 94 of the detection member 63 moves from the first position to the second position. In other words, the detected part 94 is movable from the first position to the second position due to contact of the leaf spring 96 against the abutting part 125 (part of the cartridge-receiving section 110) during insertion of the ink cartridge 30 into the cartridge-receiving section 110. Accordingly, in the first optical sensor 121, the light, which has been blocked by the detected part 94, is no longer blocked by the detected part 94 and is received at the light-receiving part. Hence, as indicated by an arrow C of FIG. 8A, the signal transmitted from the first optical sensor 121 to the controller 1 is changed again from low level to high level.

As illustrated in FIG. 5, when the detected part 94 of the detection member 63 has reached the second position, the detected part 94 abuts on the deformable member 65. The detected part 94 is thus restricted from moving into the third position.

At the second position, the detected part 94 of the detection member 63 is situated between the light-emitting part and light-receiving part of the second optical sensor 122. Thus, the detected part 94 blocks the light emitted from the light-emitting part, and a low-level signal is transmitted from the second optical sensor 122 to the controller 1. Note that a part of the detected part 94 that blocks light at the second position is different from a part of the detected part 94 that blocks light at the first position in this embodiment. However, the same portion of the detected part 94 may be configured to block the light both at the first position and at the second position.

When the ink cartridge 30 is moved further in the frontward direction 51 from the position illustrated in FIG. 4, the ink needle 102 enters the inner space of the ink supply part 34 through the ink supply port 71. The entered ink needle 102 pushes the valve to open the same, thereby allowing the ink stored in the ink chamber 36 to flow into the ink tube 20 through the inner space of the ink supply part 34 and the internal space of the ink needle 102. In the state illustrated in FIG. 5, the ink cartridge 30 has been completely attached to the cartridge-receiving section 110 and is in its attached posture. Finally, the cover of the cartridge-receiving section 110 is closed.

When the ink cartridge 30 is removed from the cartridge-receiving section 110, the leaf spring 96 is separated from the abutting part 125 of the cartridge-receiving section 110, and the detection member 63 is pivotally moved by the weight of the weight part 95. The detected part 94 is thus moved back to the first position.

Next, how the controller 1 detects the insertion of the ink cartridge 30 into the cartridge-receiving section 110 will be described with reference to the flowchart of FIG. 9.

First, in S100, the controller 1 counts how many times the signal transmitted thereto from the first optical sensor 121 is changed from low level to high level since the cover of the cartridge-receiving section 110 was opened until the cover of the cartridge-receiving section 110 is closed. The controller 1 also stores data indicative of the result of the counting in the RAM in S100.

The controller 1 then determines in S110 whether or not the cover of the cartridge-receiving section 110 is closed. The controller 1 repeats the process of S110 until detecting that the cover of the cartridge-receiving section 110 is closed (S110: NO). When the controller 1 determines in S110 that the cover of the cartridge-receiving section 110 is closed (S110: YES), in S120 the controller 1 refers to the data stored in the RAM (data indicating the number of times of changes in the signal from low to high in the first optical sensor 121).

When the number of times is equal to or larger than 1 (S120: YES), the controller 1 determines the ink cartridge 30 has been properly attached to the cartridge-receiving section 110 in S130. On the other hand, when the number of times is zero (S120: NO), the controller 1 determines in S140 that: an ink cartridge different from the ink cartridge 30 has been attached to the cartridge-receiving section 110; or the ink cartridge 30 has not been attached to the cartridge-receiving section 110. If this is the case (if the process goes to S140), the controller 1 may issue a message prompting the user to attach the ink cartridge 30, for example.

Figure 8A:
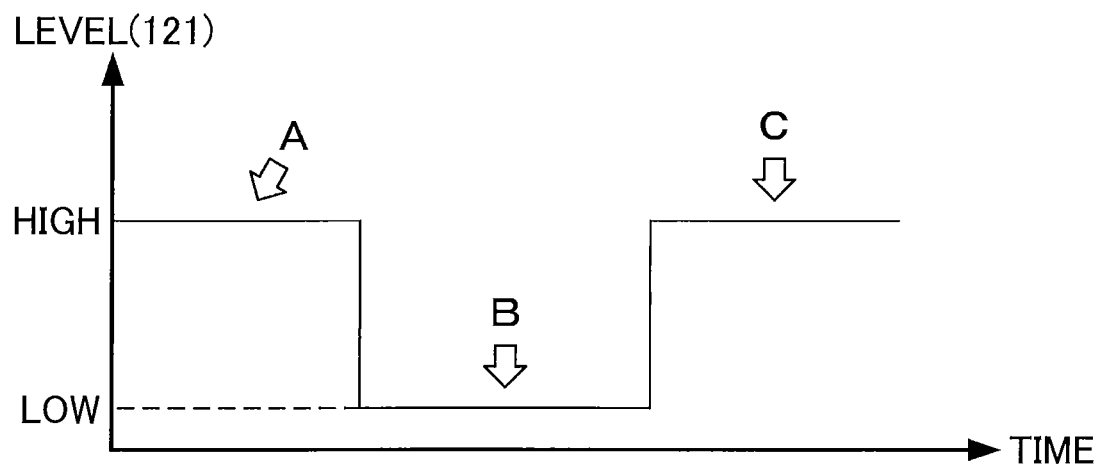
FIG. 8A is a timing chart illustrating changes in the signal outputted from the first optical sensor 121 during insertion of the ink cartridge 30 of the first embodiment.
Figure 8B:
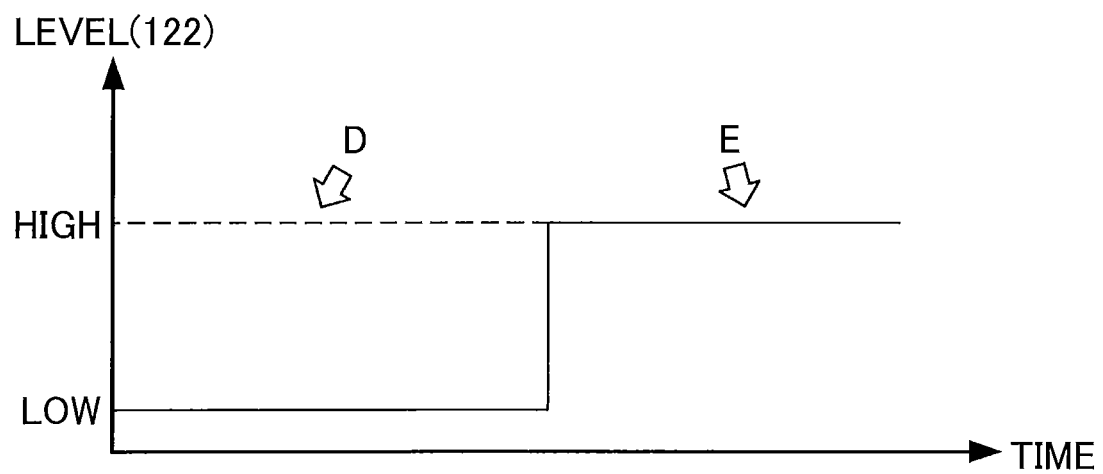
FIG. 8B is a timing chart illustrating changes in the signal outputted from the second optical sensor 122 as the ink stored in the ink cartridge 30 of the first embodiment is being consumed.

Next, movement of the detection member 63 while the amount of ink left in the ink chamber 36 becomes smaller will be described with reference to FIGS. 5, 6 and 8B.

As illustrated in FIG. 5, when the residual amount of ink in the ink chamber 36 is sufficient, the detected part 94 of the detection member 63 is positioned between the light-emitting part and light-receiving part of the second optical sensor 122, thereby blocking the light from the light-emitting part. Thus, as indicated by an arrow D in FIG. 8B, a low-level signal is transmitted from the second optical sensor 122 to the controller 1. At this time, the detected part 94 is placed on the deformable member 65 and is in contact with the deformable member 65. As long as the ink is sufficient and the internal pressure within the ink chamber 36 is larger or equal to the prescribed level, the deformable member 65 is kept inflated and protrudes higher relative to the upper wall 37, thereby maintaining the detected part 94 at the second position against the urging force of the leaf spring 96.

As the ink stored in the ink chamber 36 is consumed from the state illustrated in FIG. 5 and the amount of ink left in the ink chamber 36 is reduced, the deformable member 65 is deformed to shrink (deflate) downward as illustrated in FIG. 6. Specifically, the deformable member 65 deforms such that the volume of the space within the deformable member 65 is reduced as the internal pressure of the ink chamber 36 is reduced from that at its initial state (at the prescribed level) in accordance with outflow of the ink from the ink chamber 36. With this deformation of the deformable member 65, the detection member 63, which is receiving the urging force from the leaf spring 96, is pivotally moved downward, thereby moving the detected part 94 into the third position shown in FIG. 6. The detection member 63 may be pivotally moved by its own weight such that the detected part 94 is moved from the second position to the third position. In the attached posture, when the detected part 94 is at the third position, the detection member 63 is in contact with the abutting part 125 (part of the cartridge-receiving section 110) and in contact with the deformable member 65.

In the third position, the detected part 94 does not block the light emitted from the light-emitting part of the second optical sensor 122. Thus, as indicated by an arrow E in FIG. 8B, the signal transmitted from the second optical sensor 122 to the controller 1 is changed from low level to high level. As a result, the controller 1 can detect that a small amount of ink is left in the ink chamber 36, i.e., the residual amount of ink in the ink chamber 36 is smaller than a predetermined amount.

Operational and Technical Advantages of the First Embodiment

As described above, when the detected part 94 of the detection member 63 at the first position is detected by the first optical sensor 121 in the cartridge-receiving section 110, the ink cartridge 30 is determined to have been attached to the cartridge-receiving section 110. Further, when the detected part 94 of the detection member 63 has moved from the second position to the third position due to the deformation of the deformable member 65 and the detected part 94 is no longer detected by the second optical sensor 122, the residual amount of ink in the ink chamber 36 is determined to be less than the predetermined amount. Thus, the residual amount of ink can be accurately detected, while attachment of the ink cartridge 30 to the cartridge-receiving section 110 can be detected independently of the detection of the residual amount of ink.

Further, the detection member 63 includes the leaf spring 96 that can be deformed by receiving an external access thereto. In other words, the leaf spring 96 is resiliently deformable when applied with an external force. The resilient deformation of the leaf spring 96 generates the urging force therein urging the detected part 94 to move toward the third position, thereby facilitating movement of the detected part 94 of the detection member 63 toward the third position.

In the first embodiment, the weight part 95 urges the detection member 63 to pivotally move the detection member 63 in such a direction that the detected part 94 is moved to the first position. Alternatively, instead of the weight part 95, an adhesive member may be provided on a front end portion of the leaf spring 96 of the detection member 63, so that the adhesive member can adhere to the abutting part 125. The adhesive member may have a surface on which an adhesive agent is applied. When the ink cartridge 30 is attached to the cartridge-receiving section 110, the adhesive member can adhere to the abutting part 125. During removal of the ink cartridge 30 from the cartridge-receiving section 110, the adhesion between the adhesive member and the abutting part 125 is maintained. Thus the detection member 63 can be pivotally moved such that the detected part 94 at the second or at the third position is moved back to the first position.

2. Second Embodiment

Figure 10A:
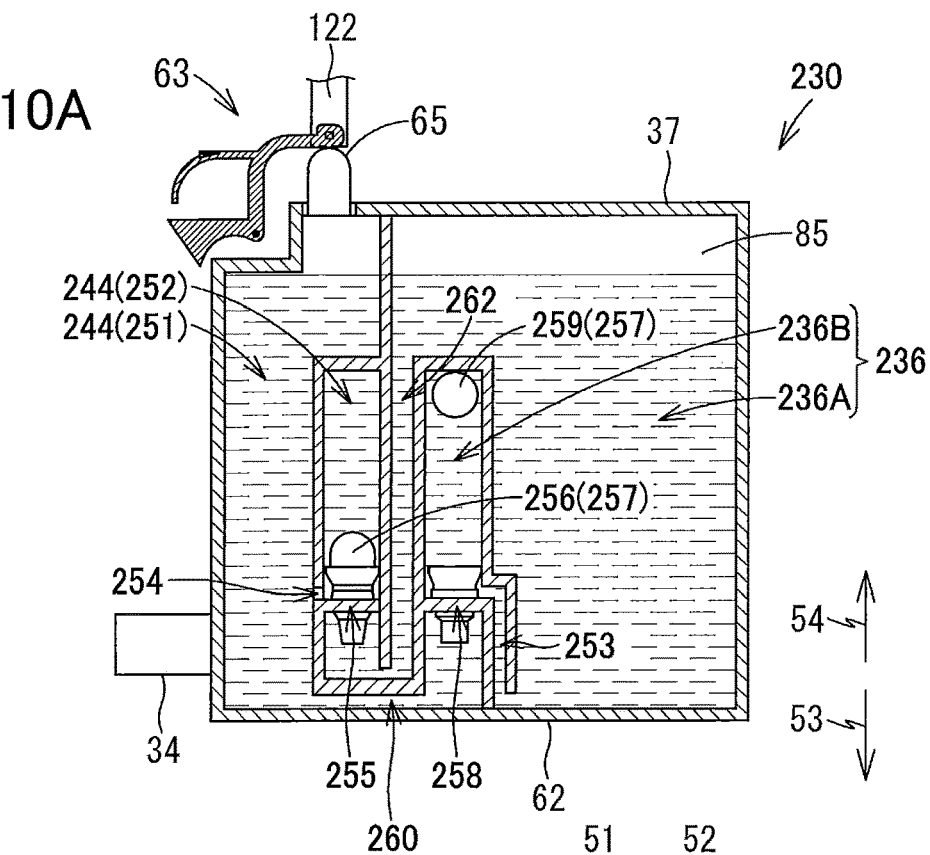
Figure 10B:
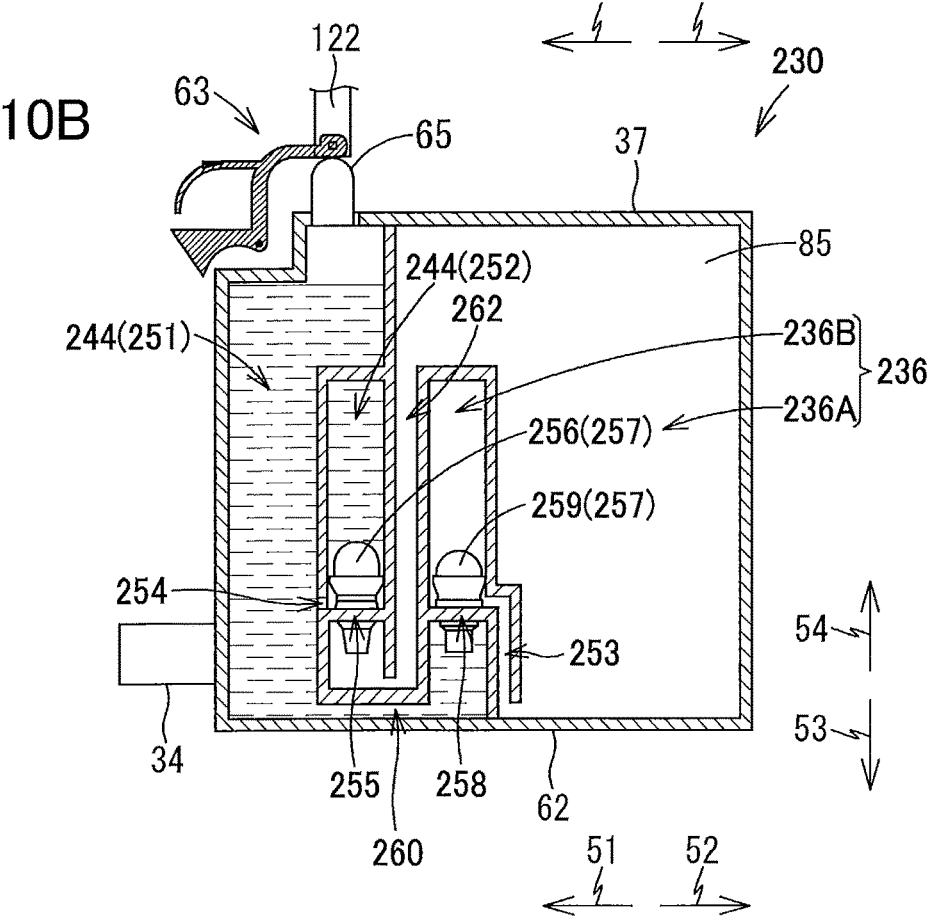
Figure 11:
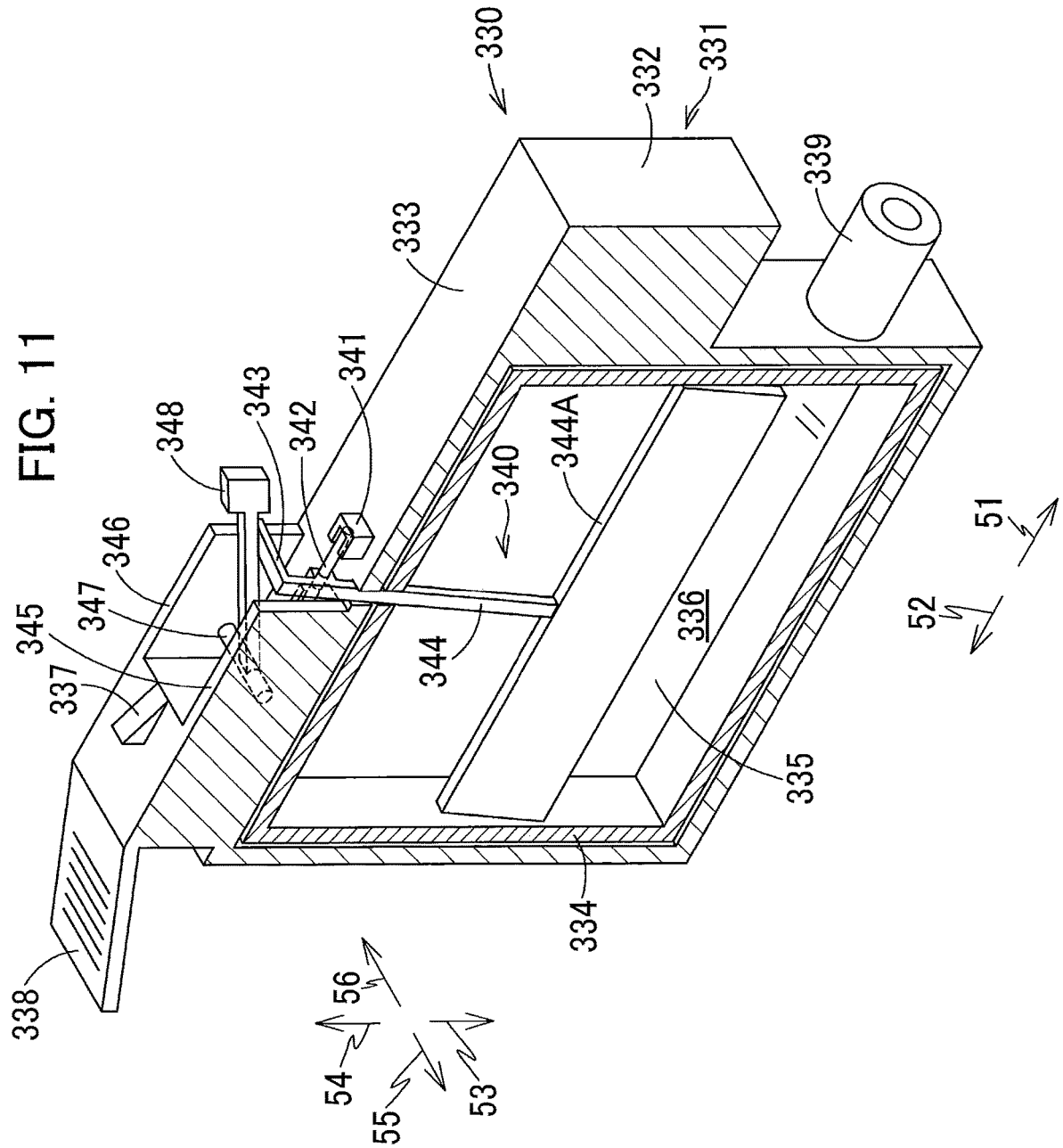
FIG. 11 is a perspective view illustrating an internal structure of an ink cartridge 330 according to a third embodiment of the present disclosure.

FIGS. 10 and 11 show an ink cartridge 230 according a second embodiment. This structure of the ink cartridge 230 can ensure that pressure inside the ink chamber can be easily and reliable reduced as the amount of ink left in the ink chamber becomes smaller. In the following description, like parts and components are designated with the same reference numerals as those of the first embodiment to avoid duplicating explanation.

Specifically, the ink cartridge 230 according to the second embodiment includes an ink chamber 236, an ink flow path 244 and a differential-pressure regulating valve 257. In FIGS. 10 and 11, the main body 61 is omitted.

The ink chamber 236 is formed in a rearward portion of the ink cartridge 230. The ink flow path 244 is formed in a frontward portion of the ink cartridge 230.

The ink flow path 244 includes a first flow path 251 and a second flow path 252. The first flow path 251 communicates with the ink supply part 34. The second flow path 252 is formed further in the rearward direction 52 (i.e., rearward) relative to the first flow path 251. The second flow path 252 is in communication with the first flow path 251 through an opening 254, and in communication with a first ink chamber 236A of the ink chamber 236 through an opening 255 and a passage 262. The opening 255 is opened and closed by a sphere 256 that is movable vertically in the upward direction 54 and in the downward direction 53.

The ink chamber 236 includes the first ink chamber 236A and a second ink chamber 236B. The second ink chamber 236B is formed further in the rearward direction 52 (i.e., rearward) relative to the second flow path 252. The second ink chamber 236B is in communication with the first flow path 251 through an opening 258 and a passage 260, and in communication with the first ink chamber 236A through a passage 253. The opening 258 is opened and closed by a sphere 259 that is movable vertically in the upward direction 54 and in the downward direction 53.

The differential-pressure regulating valve 257 is provided between the ink chamber 236 and ink flow path 244. The differential-pressure regulating valve 257 can bring the ink chamber 236 and ink flow path 244 into communication with each other based on a difference between pressure within the ink chamber 236 and pressure inside the ink flow path 244.

Specifically, the differential-pressure regulating valve 257 includes the above-mentioned two spheres 256 and 259. The sphere 256 is disposed in the second flow path 252. The sphere 256 has a specific gravity larger than a specific gravity of ink. Thus, when the second flow path 252 is filled with ink, the sphere 256 moves (i.e., sinks) in the downward direction 53 to close the opening 255. The sphere 259 is disposed in the second ink chamber 236B. The sphere 259 has a specific gravity smaller than the specific gravity of ink. Thus, when the second ink chamber 236B is filled with ink, the sphere 259 moves upward in the upward direction 54 (i.e., floats) by its buoyancy relative to the ink, opening the opening 258.

The deformable member 65 and detection member 63 are provided at an upper end portion of the first flow path 251. That is, the deformable member 65 communicates with the ink chamber 236 through the ink flow path 244. The deformable member 65 and detection member 63 have the same configuration as those in the first embodiment, and thus descriptions thereof will be omitted.

Now, operations of the differential-pressure regulating valve 257 according to the second embodiment will be described.

As illustrated in FIG. 10A, when both the ink chamber 236 and ink flow path 244 are filled with ink, the sphere 256 sinks to close the opening 255, whereas the sphere 259 floats to open the opening 258. Accordingly, for supplying ink from the ink cartridge 230 to the ink tube 20, ink in the first ink chamber 236A is first fed to the second ink chamber 236B, then to the first flow path 251, and then to the ink supply part 34, and finally to the ink tube 20.

When ink in the ink chamber 236 is reduced to the state shown in FIG. 10B, the buoyancy of the sphere 259 attributed to the ink is eliminated, and the sphere 259 is moved in the downward direction 53 to close the opening 258. Thus, communication between the ink flow path 244 and ink chamber 236 is interrupted. Accordingly, in this state, the ink in the ink flow path 244 is supplied to the ink tube 20 through the ink supply part 34.

When the amount of ink in the ink flow path 244 is decreased thereafter, a negative pressure is generated in the ink flow path 244 (see FIG. 10C). In FIG. 10C, generation of the negative pressure is illustrated by an increase in density of dashed lines (i.e., a smaller gap between the neighboring dashed lines) in the ink flow path 244.

As the negative pressure within the ink flow path 244 becomes smaller than the pressure within the ink chamber 236 by a predetermined value or larger, the sphere 256 starts to move upward due to the negative pressure within the ink flow path 244, as shown in FIG. 10D. In other words, the sphere 256 opens the opening 255 when the pressure within the ink flow path 244 has become smaller than the pressure inside the ink chamber 236 by the predetermined value or larger. The predetermined value is set to an appropriate value by adjusting a material and size of the sphere 256 or a size of the opening 255, so that the ink in the ink flow path 244 can reliably and efficiently flow outside therefrom.

Further, as shown in FIG. 10D, when the negative pressure within the ink flow path 244 has become smaller than the pressure within the ink chamber 236 by the predetermined value or larger, the deformable member 65 is deformed to deflate in the downward direction 53. As a result, the deformable member 65 is retracted in the downward direction 53 relative to an upper surface of the upper wall 37. The detection member 63 is therefore pivotally moved due to the urging force of the leaf spring 96 such that the detected part 94 is moved from the second position to the third position. Accordingly, the controller 1 can detect that the amount of ink left in the ink chamber 236 and ink flow path 244 becomes small.

When the opening 255 is opened, the first ink chamber 236A and second flow path 252 are brought into communication with each other. As a result, the level of the pressure within the ink flow path 244 returns from the level before the opening 255 is opened (negative pressure) back to a level slightly closer to atmospheric pressure. The sphere 256 thus closes the opening 255 again. Note that the pressure inside the ink chamber 236 at this time is set at such a level that the elastically-deformed deformable member 65 does not restore its original shape. The ink within the ink flow path 244 is subsequently consumed thereafter, while repeating the opening and closing of the opening 255.

According to the second embodiment, when a large amount of ink is left in the ink chamber 236, the sphere 259 floats by its buoyancy, so that the opening 258 is opened. Accordingly, the ink in the ink chamber 236 flows into the ink flow path 244 through the opening 258 and flows out of the ink flow path 244 through the ink supply part 34. Further, since the opening 258 is opened, the pressure inside the ink chamber 236 and the pressure inside the ink flow path 244 are equal to each other. Thus, the opening 155 is closed.

When the residual amount of ink in the ink chamber 236 has been reduced, the sphere 259 can no longer maintain its floating state and closes the opening 258. Thus, communication between the ink flow path 244 and the ink chamber 236 is blocked, and hence, ink in the ink flow path 244 starts to be supplied therefrom to the ink tube 20 through the ink supply part 34. As a result, the pressure within the ink flow path 244 becomes smaller and the negative pressure thereof becomes larger. The opening 255 is thereby opened, and the pressure inside the ink flow path 244 is increased to the same level as the pressure inside the ink chamber 236. When the pressure inside the ink flow path 244 has become the same level as the pressure inside the ink chamber 236, the opening 255 is closed. Thereafter repeated are: opening of the opening 255 due to a reduction in the pressure inside the ink flow path 244 attributed to the flow-out of the ink in the ink flow path 244; and closing of the opening 255 due to an increase in the pressure inside the ink flow path 244 caused by the opening of the opening 255.

In the second embodiment, the deformable member 65 communicates with the ink chamber 236 through the ink flow path 244. Thus, the deformable member 65 can be elastically deformed by the change in the pressure inside the ink flow path 244.

3. Third Embodiment

An ink cartridge 330 according to a third embodiment will be described next with reference to FIG. 11. In the following description, like parts and components are designated with the same reference numerals as those of the first embodiment to avoid duplicating explanation.

The ink cartridge 330 includes a detection member 348 and a lever 340, instead of the detection member 63 and deformable member 65 of the first embodiment.

As illustrated in FIG. 11, the ink cartridge 330 includes a main body 331 constituting an outer shape of the ink cartridge 330. The main body 331 has a generally flat shape as a whole having a height in the downward direction 53 and upward direction 54, a width in the rightward direction 55 and leftward direction 56, and a length in the frontward direction 51 and rearward direction 52, the width being smaller than the height and the length. The main body 331 defines an internal space therein.

As illustrated in FIG. 11, an inner frame 334 is housed in the internal space of the main body 331. The inner frame 334 is a frame having an opening that is open in the rightward direction 55. This opening of the inner frame 334 is liquid-tightly sealed by a film 335, thereby forming an ink chamber 336 inside the inner frame 334. The ink chamber 336 stores ink therein. The ink chamber 336 has a dimension in the frontward direction 51 and rearward direction 52 that is larger than a dimension thereof in the upward direction 54 and downward direction 53.

The main body 331 has a front wall 332 at which an ink supply part 339 is provided. Specifically, the ink supply part 339 is disposed on a lower end portion of the 332 to protrude in the frontward direction 51 therefrom. The ink supply part 339 has the same configuration as the ink supply part 34 of the first embodiment, so that detailed description thereof will be omitted. An inner space of the ink supply part 339 is in communication with the ink chamber 336.

The main body 331 has an upper wall 333 on which a lock part 337 and an operation part 338 are provided. Specifically, the lock part 337 and operation part 338 are arranged on a rear portion of the upper wall 333 to protrude in the upward direction 54 therefrom. The lock part 337 and operation part 338 have the same configurations as the lock part 43 and the operation part 90 of the first embodiment, respectively. Therefore detailed descriptions of the lock part 337 and operation part 338 are omitted here.

The lever 340 is provided such that a major portion thereof, except an upper portion 343 thereof, is accommodated inside the main body 331.

Specifically, the lever 340 includes a pivot shaft 342, the upper portion 343, and a lower portion 344.

The pivot shaft 342 is supported by the upper wall 333 of the main body 331 through a bearing 341. The bearing 341 is provided on the upper wall 333 and extend in the frontward direction 51 and rearward direction 52. The lever 340 is pivotally movable about an axis of the pivot shaft 342.

The upper portion 343 extends in the upward direction 54 from the pivot shaft 342 and then bent in the leftward direction 56. The lower portion 344 extends in the downward direction 53 from the pivot shaft 342. The lower portion 344 extends into the inner space of the main body 331 and is in contact with the film 335. Specifically, the lower portion 344 includes an abutting part 344A that is in contact with the film 335. The abutting part 344A has a laterally elongated shape having a larger dimension in the frontward direction 51 and rearward direction 52 than a dimension thereof in the upward direction 54 and downward direction 53.

Although not illustrated in FIG. 11, the lever 340 is biased, by a biasing member such as a torsional coil spring, in such a direction that the lower portion 344 (abutting part 344A) abuts against the film 335.

Further, as also shown in FIG. 11, a pair of support walls 345 and 346 is provided on the upper wall 333 of the main body 331 to protrude upward in the upward direction 54 therefrom. The support walls 345 and 346 are arranged further in the rearward direction 52 (i.e., rearward) relative to the upper portion 343 of the lever 340. The support walls 345 and 346. The support walls 345 and 346 are arranged to be separated from each other in the rightward direction 55 and leftward direction 56 and protrude upward in the upward direction 54 from the upper wall 333. Further, the support walls 345 and 346 support a support shaft 347. The support shaft 347 extends in the rightward direction 55 and leftward direction 56, and is disposed further in the upward direction 54 (i.e., upward) relative to the upper wall 133.

The detection member 348 is pivotally movably supported by the support shaft 347. The detection member 348 has a flat plate-like shape elongated in a direction perpendicular to an axis of the support shaft 347. The detection member 348 has a tip end portion that can be detected by the first optical sensor 121 and second optical sensor 122. The detection member 348 abuts on the upper end portion 343 of the lever 340 from above.

The detection member 348 is made movable by the pivotal movement of the lever 340. The detection member 348 can be detected by the first optical sensor 121 and second optical sensor 122 in a posture shown in FIG. 11, that is, when the detection member 348 is located on the upper portion 343 of the lever 340 from above (i.e., detected position).

As the ink stored in the ink chamber 336 flows out therefrom through the ink supply part 339, the film 335 is deformed to be recessed inside the ink chamber 336. In accordance with deformation of the film 335, the lever 140 biased by the biasing member is pivotally moved such that the lower portion 344 moves in the leftward direction 56 and the upper portion 343 moves in the rightward direction 55. Since the upper portion 343 moves in the rightward direction 55 away from the detection member 348, the upper portion 343 is no longer located below the detection member 348. As a result, the detection member 348 is pivotally moved in the downward direction 53 due to gravity. The detection member 348, which has pivotally moved in the downward direction 53, is located further in the downward direction 53 (i.e., downward) relative to the detection position 348 at the detection position shown in FIG. 11. That is, the detection member 348 that has been pivoted in the downward direction 53 is no longer detected by the first and second optical sensors 121 and 122.

The depicted third embodiment can achieve the same effects as those in the first embodiment.

Further, since the detection member 348 is disposed on the upper wall 333 of the main body 331, a volume efficiency of the ink chamber 336 is improved. Further, the abutting part 344A of the lever 340 extends onto the film 335 up to a position near the ink supply part 339. Accordingly, when the film 335 is deformed, the abutting part 344A can suppress the deformed film 335 from getting in close contact with the inner frame 334 near the ink supply part 339 and thus interrupting ink flow from the ink chamber 336 into the ink supply part 339.

4. Other Variations and Modifications

In the depicted embodiments, either the detected part 94 of the detection member 63 or the detection member 348 is situated between the light-emitting part and light-receiving part of the first optical sensor 121 or the second optical sensor 122, thereby blocking the light emitted from the light-emitting part. Alternatively, however, the detected part 94 of the detection member 63 or the detection member 348 may be configured to attenuate the light emitted from the light-emitting part, rather than blocking the light. Specifically, illumination intensity of light received at the light-receiving part when the detected part 94 of the detection member 63 or the detection member 348 is positioned between the light-emitting part and light-receiving part may be set to become smaller than that when the detected part 94 of the detection member 63 or the detection member 348 is not positioned between the light-emitting part and light-receiving part.

Further, in the depicted embodiments, each ink chamber is configured of a wall (frame) and a film. Specifically, the ink chamber 36 and ink chamber 236 are respectively configured of the peripheral wall 86 and film (not illustrated); and the ink chamber 336 is configured of the inner frame 334 and film 335. Alternatively, however, the ink chamber may be formed without using a wall (frame), and may be constructed as an inner space of a bag-like member formed by a flexible film. In this case, a biasing member such as a spring may be provided inside the bag-like member to restrict deformation of the film. With this configuration, a predetermined inner volume of the ink chamber can be maintained even if the film deforms as to reduce the inner volume of the ink chamber. The pressure inside the ink chamber can become smaller as ink is consumed, as in the embodiments.

While the ink cartridge 30, 230, 330 is attached to the cartridge-receiving section 110 in the horizontal direction in the above respective embodiments, the ink cartridge 30, 230, 330 may be necessarily to be mounted horizontally. For example, the ink cartridge 30, 230, 330 may be configured to be inserted vertically into the cartridge-receiving section 110. In this case, arrangements and moving directions of the detection member 63, detection member 348, and lever 340 and the like may be changed appropriately depending on the direction in which the ink cartridge 30, 230, 330 is inserted.

Further, while ink serves as an example of the liquid in the depicted embodiments, the liquid of the present disclosure is not limited to ink. For example, the liquid may be a pretreatment liquid that is ejected onto sheets prior to ink during a printing operation.

What is claimed is:

1. A liquid cartridge comprising:
    a cartridge body defining a liquid chamber configured to store liquid therein, the cartridge body comprising a front wall and an upper wall defining part of the liquid chamber;
    a liquid-supply part disposed at the front wall of the cartridge body;
    a detection member having a detected part subject to external detection by light, the detected part being movable from a first position to a second position positioned lower than the first position with respect to a vertical direction in an attached posture of the liquid cartridge, the detection member having a weight part urging the detected part toward the first position, and the detected part and the weight part being positioned outside of the liquid chamber; and
    a circuit board,
    wherein in the attached posture of the liquid cartridge,
        the circuit board faces upward; and
        the circuit board and the detected part are positioned higher than the liquid chamber.

2. The liquid cartridge as claimed in claim 1, wherein the detection member is pivotable to move the detected part between the first position and the second position.

3. The liquid cartridge as claimed in claim 2 further comprising a shaft bar supported by the cartridge body and positioned outside of the liquid chamber, the detection member being configured to pivot about the shaft bar,
    wherein in the attached posture of the liquid cartridge, the detected part is positioned higher than the shaft bar, and the weight part is positioned lower than the shaft bar with respect to the vertical direction when the detection member is at the first position.

4. The liquid cartridge as claimed in claim 1, wherein the cartridge body further comprises a rear wall disposed in separation from the front wall,
    wherein the upper wall connects the front wall to the rear wall, the detected part being positioned higher relative to the upper wall at the first position and at the second position in the attached posture of the liquid cartridge.

5. The liquid cartridge as claimed in claim 4, the liquid cartridge being configured to be inserted in a frontward direction and mounted in a cartridge-receiving section provided with a first optical sensor and a second optical sensor, each of the first optical sensor and the second optical sensor being configured to emit light in a direction crossing the frontward direction and the vertical direction,
    wherein the detected part at the first position is configured to block or attenuate the light emitted from the first optical sensor during insertion of the liquid cartridge into the cartridge-receiving section, and wherein the detected part at the second position is configured to block or attenuate the light emitted from the second optical sensor upon completion of the mounting of the liquid cartridge in the cartridge-receiving section.

6. The liquid cartridge as claimed in claim 5, wherein the detected part at the first position detected by the first optical sensor provides information on whether the liquid cartridge is mounted in the cartridge-receiving section.

* * * * *